United States Patent
Siegert et al.

(10) Patent No.: US 12,186,720 B2
(45) Date of Patent: Jan. 7, 2025

(54) SYSTEMS AND METHODS FOR ACID MIXING

(71) Applicant: TEXAS INTEGRITY ACID SOLUTIONS, LLC, Bryan, TX (US)

(72) Inventors: Britton Siegert, College Station, TX (US); Gregory Johnson, Bryan, TX (US)

(73) Assignee: Texas Integrity Acid Solutions, LLC, Bryan, TX (US)

( * ) Notice: Subject to any disclaimer, the term of this patent is extended or adjusted under 35 U.S.C. 154(b) by 0 days.

(21) Appl. No.: 18/625,185

(22) Filed: Apr. 2, 2024

(65) Prior Publication Data
US 2024/0335806 A1 Oct. 10, 2024

Related U.S. Application Data

(60) Provisional application No. 63/494,232, filed on Apr. 5, 2023.

(51) Int. Cl.
*B01F 35/00* (2022.01)
*B01F 23/40* (2022.01)
(Continued)

(52) U.S. Cl.
CPC ........ *B01F 35/8311* (2022.01); *B01F 23/483* (2022.01); *B01F 23/49* (2022.01);
(Continued)

(58) Field of Classification Search
CPC .......................... B01F 35/8311; B01F 23/483; B01F 35/2217; B01F 35/189; B01F 2101/49;
(Continued)

(56) References Cited

U.S. PATENT DOCUMENTS 6,799,883 B1 10/2004 Urquhart et al.
7,344,297 B2 3/2008 Urquhart
(Continued)

FOREIGN PATENT DOCUMENTS

CN 111151186 A 5/2020

OTHER PUBLICATIONS

Hydration in Fracking: SPR Hydration Benefits; hydrodynamics. com (https://www.hydrodynamics.com/markets/petroleum/hydration/), Accessed Mar. 28, 2023, 2 pgs.
(Continued)

*Primary Examiner* — Anshu Bhatia
(74) *Attorney, Agent, or Firm* — Mackey Law Firm PLLC

(57) ABSTRACT

A system for mixing acid and water can include a tank for holding acid, an acid pump for pumping acid out of the tank, an acid flow meter, an acid control valve, a water pump for pumping water, a water flow meter, a water control valve, a flush valve to selectively flush the system with water, and a controller to monitor the flow meters and control the pumps and the valves. The acid control valve and/or the water control valve can be an electronically controlled valve. The flush valve can be an electronically controlled valve to selectively permit water to flow from downstream of the water pump to upstream of the acid pump. The acid control valve, the water control valve, the flush valve, or any combination thereof can be throttled by the controller to control flow therethrough.

20 Claims, 16 Drawing Sheets

(51) Int. Cl.
  *B01F 33/502* (2022.01)
  *B01F 35/11* (2022.01)
  *B01F 35/21* (2022.01)
  *B01F 35/221* (2022.01)
  *B01F 35/83* (2022.01)
  *B01F 101/49* (2022.01)

(52) U.S. Cl.
  CPC ...... *B01F 33/5023* (2022.01); *B01F 33/5026* (2022.01); *B01F 35/11* (2022.01); *B01F 35/189* (2022.01); *B01F 35/21112* (2022.01); *B01F 35/2115* (2022.01); *B01F 35/2213* (2022.01); *B01F 35/2217* (2022.01); *B01F 2101/49* (2022.01)

(58) Field of Classification Search
  CPC .. B01F 33/5023; B01F 35/2213; B01F 35/11; B01F 23/49; B01F 35/21112; B01F 35/2115; B01F 33/5026
  See application file for complete search history.

(56) References Cited

U.S. PATENT DOCUMENTS

| | | | |
|---|---|---|---|
| 8,251,570 | B2 | 8/2012 | Hughes et al. |
| 9,175,530 | B2 | 11/2015 | Ela et al. |
| 9,181,789 | B2 | 11/2015 | Nevison |
| 9,327,212 | B2 | 5/2016 | Blank et al. |
| 9,353,585 | B2 | 5/2016 | Hayworth |
| 9,452,394 | B2 | 9/2016 | Weinstein et al. |
| 9,744,503 | B2 | 8/2017 | Kenowski |
| 9,751,062 | B2 | 9/2017 | Barton et al. |
| 10,007,275 | B2 | 6/2018 | Uhlhorn et al. |
| 10,081,000 | B2 | 9/2018 | Machuca et al. |
| 10,415,332 | B2 | 9/2019 | Morris et al. |
| 10,661,235 | B2 | 5/2020 | Noles, Jr. |
| 10,675,601 | B2 | 6/2020 | Fisher |
| 10,954,432 | B2 | 3/2021 | Panga et al. |
| 11,262,174 | B2 | 3/2022 | Oliver et al. |
| 11,391,133 | B2 | 7/2022 | Coli et al. |
| 11,416,012 | B2 | 8/2022 | Miller |
| 11,513,500 | B2 | 11/2022 | Jaaskelainen et al. |
| 2005/0029170 | A1* | 2/2005 | Urquhart ............. B01F 35/2133 366/132 |
| 2012/0231982 | A1* | 9/2012 | Weinstein ................ C09K 8/90 507/216 |
| 2020/0231378 | A1 | 7/2020 | Lambert et al. |
| 2021/0138412 | A1 | 5/2021 | Sawyer |
| 2021/0308638 | A1 | 10/2021 | Zhong et al. |
| 2022/0323919 | A1 | 10/2022 | Pike et al. |
| 2023/0083234 | A1 | 3/2023 | Cook et al. |

OTHER PUBLICATIONS

Hydraulic Fracturing Fluids—Composition and Additives (Republished from: Modern Shale Gas Development in the United States by the U.S. Department of Energy); Geology.com (https://geology.com/energy/hydraulic-fracturing-fluids/, Accessed Mar. 28, 2023, 5 pgs.

Mobile Hydraulic Fracturing Pump System; Empowering Pumps & Equipment (https://empoweringpumps.com/), Oct. 3, 2016, 4 pgs.

Hydraulic Fracturing Process Monitoring; Comtrol Corporation (https://comtrol.com/solutions/energy/energy-solutions/hydraulic-fracturing-process-monitoring) Accessed Mar. 28, 2023, 2 pgs.

Optimization of Fracturing Fluid and Retarded Acid for Stimulating Tight Naturally Fractured Bedrock Reservoirs, ACS Publications, ACS Omega 2022; Jul. 14, 2022, 29 pgs.

International Search Report and Written Opinion mailed Jul. 3, 2024 for PCT Application No. PCT/US2024/022886.

\* cited by examiner

SYSTEMS AND METHODS FOR ACID MIXING

CROSS-REFERENCE TO RELATED APPLICATIONS

This application claims the benefit of U.S. Provisional Patent Application No. 63/494,232 filed Apr. 5, 2023, the entire contents of which are incorporated herein by reference.

BACKGROUND OF THE INVENTION

Field of the Invention

The present disclosure relates generally to hydrocarbon formation fracturing operations in the oil and gas industry and more specifically relates to providing precise acid concentrations for such operations.

Description of the Related Art

There are currently other systems used to mix water, acid, and/or other chemicals in connection with hydrocarbon formation fracturing (or "fracing") operations in the oil and gas industry. However, conventional systems can be complex to set up and operate, which can lead to job-site safety concerns as well as inefficiency and inconsistency.

SUMMARY OF THE INVENTION

Applicants have created new and useful devices, systems and methods for providing controlled acid concentrations, such as for fracturing operations in the oil and gas industry. In at least one embodiment, a system for mixing acid and water can include a tank for holding acid, an acid pump for pumping acid out of the tank, an acid flow meter, an acid control valve, a water pump for pumping water, a water flow meter, a water control valve, a flush valve to selectively flush the system with water, a controller configured to monitor the flow meters and control the pumps and the valves, or any combination thereof. In at least one embodiment, the acid flow meter and/or the acid control valve can be located downstream of the acid pump. In at least one embodiment, the acid control valve can be an electronically controlled acid valve. In at least one embodiment, the water flow meter and/or the water control valve can be located downstream of the water pump. In at least one embodiment, the water control valve can be an electronically controlled water valve. In at least one embodiment, the flush valve can be an electronically controlled valve configured to selectively permit water to flow from downstream of the water pump to upstream of the acid pump. In at least one embodiment, the acid control valve, the water control valve, the flush valve, or any combination thereof can be throttled by the controller to control flow therethrough.

In at least one embodiment, the entire system, or any portion thereof, can be mounted on a skid. In at least one embodiment, the system can deliver an acid/water mixture to a manifold, a frac pump, an output valve, or any combination thereof. In at least one embodiment, the system can include a vapor recovery unit coupled to the tank, which can resist emission of acid vapors into the atmosphere. In at least one embodiment, the system can include a variable frequency drive (VFD) for any or each pump. In at least one embodiment, the system can output a predetermined acid/water mixture for pumping down a wellbore in connection with fracturing of a hydrocarbon formation.

In at least one embodiment, a skid mounted system for mixing acid from a tank with water can include a skid, a water inlet line, a water pump mounted to the skid for pumping water from the water inlet line, a water flow meter, a water control valve, an acid pump mounted to the skid for pumping acid out of the tank, an acid flow meter, an acid control valve, a flush valve, a controller to monitor the flow meters and control the pumps and the valves, or any combination thereof.

In at least one embodiment, the water inlet line can include a first water inlet coupling configured to receive water from a first side of the skid and a second water inlet coupling configured to receive water from a second side of the skid. In at least one embodiment, the first side is different from the second side. In at least one embodiment, the first side is opposite from the second side.

In at least one embodiment, the water flow meter and/or water control valve can be mounted to the skid downstream of the water pump. In at least one embodiment, the acid flow meter and/or the acid control valve can be mounted to the skid downstream of the acid pump. In at least one embodiment, the flush valve can be an electronically controlled flush valve mounted to the skid. In at least one embodiment, the flush valve can selectively permit water to flow from downstream of the water pump to upstream of the acid pump.

In at least one embodiment, the system can include an acid inlet valve upstream of the acid pump. In at least one embodiment, the flush valve can selectively permit water to flow from downstream of the water pump to between the acid pump and the acid inlet valve. In at least one embodiment, the flush valve can open when the acid inlet valve closes. For example, the controller can automatically open the flush valve when the controller closes the acid inlet valve. In at least one embodiment, the controller can close the acid inlet valve and open the flush valve when a desired quantity of mixture has been dispensed. In at least one embodiment, the controller can close or throttle the water control valve when the flush valve is opened, to force water through the acid pump, acid control valve, acid flow meter, or any combination thereof.

In at least one embodiment, the controller can automatically turn off the pumps once a desired quantity of water has been pumped through the acid control valve and the acid pump, such as to adequately flush the system. In at least one embodiment, the controller can automatically turn off the pumps once a desired quantity of water has been pumped through the acid control valve and the acid pump and the flow meters indicate a lack of flow, such as might be expected if an operator closed in input and/or output valve. In at least one embodiment, the controller can automatically turn off the pumps once a desired quantity of water has been pumped through the acid control valve and the controller receives a stop command, such as from an operator.

In at least one embodiment, the controller can control both pumps to maintain a desired output pressure. For example, the controller can control both pumps to maintain an output pressure of between 40 and 65 PSI downstream of the pumps independently of flow through the pumps.

In at least one embodiment, the controller can control the water control valve and the acid control valve to maintain a desired acid mixture. In at least one embodiment, the system can include a temperature sensor allowing the controller to monitor a temperature of the acid. In at least one embodiment, the controller can compensate for a temperature of the acid, such as by throttling the acid valve.

In at least one embodiment, the system can include a generator mounted to the skid for powering the pumps and the controller. In at least one embodiment, the system can include an acid inlet line having an acid inlet coupling configured to receive acid from a third side of the skid, which can be different than the first side and/or the second side. In at least one embodiment, the tank and/or the skid can be mounted to a trailer, such as with the tank adjacent to the third side of the skid, which can be different than the first side and/or the second side. In at least one embodiment, the tank can be mounted next to the skid adjacent to the acid inlet coupling. In at least one embodiment, the controller can be mounted to the skid, such as along a fourth side, different from the first side, the second side, the third side, or any combination thereof.

In at least one embodiment, a control system for mixing acid from a tank with water can include a water pump control output to control a speed of a water pump, a water flow meter to monitor a water flow rate, a water control valve to control water flow rate, an acid pump control output to control a speed of an acid pump, an acid flow meter to monitor an acid flow rate of the acid from the tank through the acid pump, an acid control valve to control acid flow rate, an acid inlet valve to selectively permit acid to flow from the tank, a temperature sensor configured to monitor a temperature of the acid, a flush valve to selectively permit water to flow from downstream of the water pump to upstream of the acid pump, an input device to receive pertinent data, a controller to monitor the flow meters and/or sensor and control any of the valves and/or pumps, or any combination thereof. In at least one embodiment, the input device can receive an acid specific gravity, a desired acid concentration, a desired mixture volume, a desired flush volume, or any combination thereof. In at least one embodiment, the controller can calculate an acid to water ratio to achieve the desired acid concentration using the acid specific gravity and/or the temperature of the acid, control either or both pumps to maintain a desired output pressure, control the water control valve and/or the acid control valve to maintain the desired acid concentration, until the desired mixture volume is reached, control the acid inlet valve and/or the flush valve to automatically stop acid flow from the tank and/or trigger a flush cycle, or any combination thereof. In at least one embodiment, the flush cycle can flush the acid flow meter, the acid control valve, the acid pump, or any combination thereof with water, such as after the desired mixture volume is reached.

In at least one embodiment, a method of operating a system for mixing acid from a tank with water can include filling the tank with acid (such as at a supplier location), reviewing specifications of the acid (such as provided from the acid supplier and/or at the supplier location), sampling the acid in the tank to confirm the acid in the tank meets one or more specifications, confirming that the tank holds a desired quantity of the acid, inputting a specific gravity of the acid from the specifications into a controller, inputting a desired acid concentration into the controller, inputting a desired mixture volume into the controller, inputting a desired flush volume into the controller, or any combination thereof. In at least one embodiment, the flush volume can include a plumbing volume of the system, any discharge hoses or other conduits, such as from the system to a frac pump, suction or discharge plumbing of a frac pump, a frac pump fluid end, or any combination thereof. A mixing operation of the system can be initiated by an operator actuating a start button of the controller, which can cause the system to provide the desired mixture volume at the desired acid concentration.

In at least one embodiment, a method of operating a system for mixing acid from a tank with water can include inputting an acid specification into a controller, inputting a desired acid concentration into the controller, inputting a desired mixture volume into the controller, or any combination thereof. In at least one embodiment, the method can include initiating, through the controller, a mixing operation to provide the desired mixture volume at the desired acid concentration. In at least one embodiment, the method can include at least partially filling the tank with acid, reviewing one or more specifications, sampling the acid in the tank to confirm the acid in the tank meets one or more specifications, confirming that the tank holds a desired quantity of the acid, or any combination thereof. In at least one embodiment, the method can include inputting a desired flush volume into the controller. In at least one embodiment, the flush volume can include or be based at least partially on a plumbing volume of all or a portion of the system.

In at least one embodiment, a method of operating a system for mixing acid from a tank with water can include initiating a mixing operation by an operator hitting a start button of a controller, opening a water control valve and turning on a water pump, opening an acid control valve and turning on an acid pump, monitoring an acid temperature, throttling the pumps to maintain a desired output pressure, throttling the valves to maintain a desired mixture accounting for the acid temperature, automatically flushing the acid control valve and the acid pump with water from the water pump when a desired quantity of mixture has been dispensed, or any combination thereof. In at least one embodiment, the controller can autonomously and/or automatically open the water control valve and turn on the water pump, open the acid control valve and turn on the acid pump, monitor the acid temperature, throttle the pumps to maintain the desired output pressure, throttle the valves to maintain the desired mixture accounting for the acid temperature, automatically flush the acid control valve and the acid pump with water from the water pump once the desired quantity of mixture has been dispensed.

DETAILED DESCRIPTION OF THE INVENTION

Figure 1:
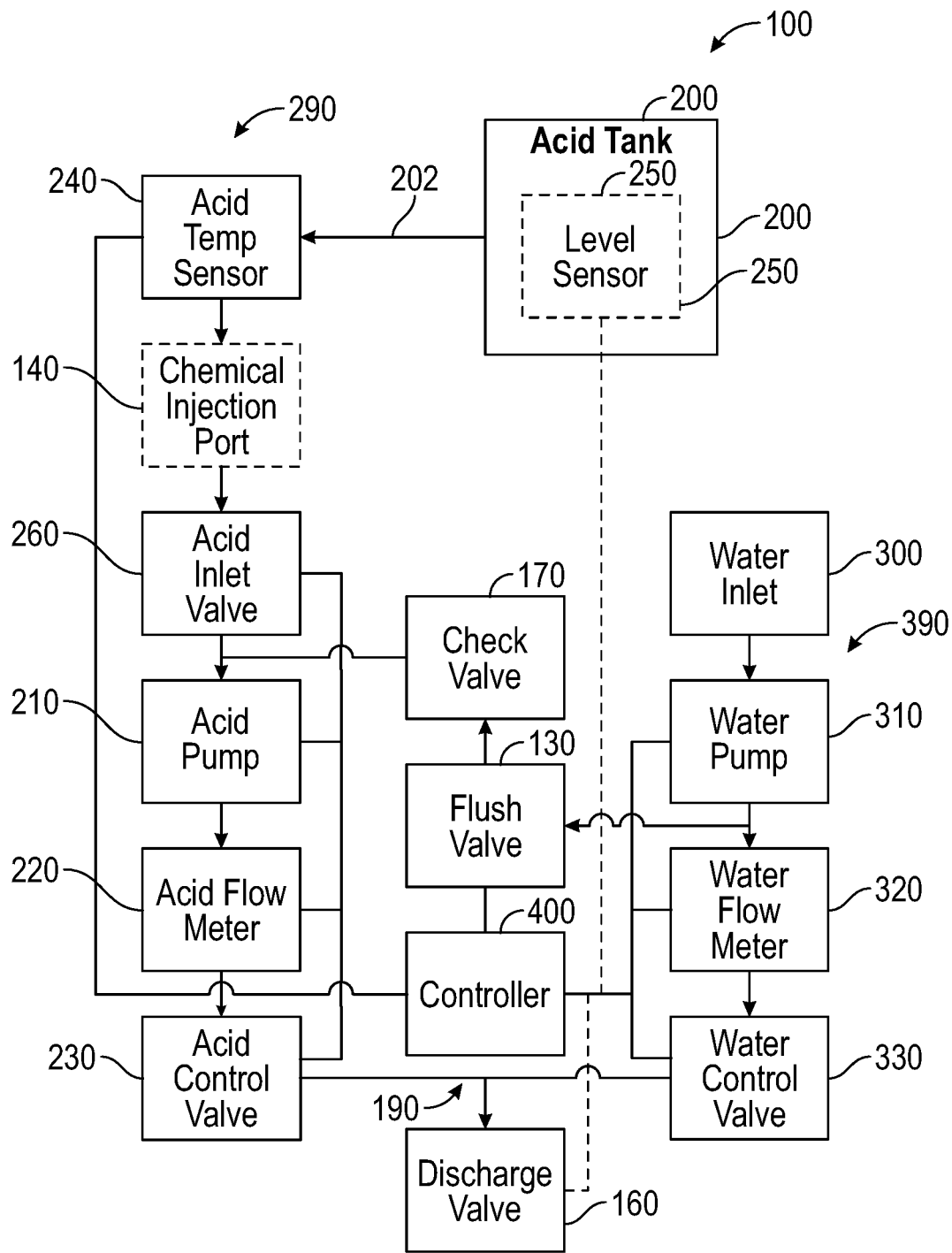
FIG. 1 is a schematic diagram of one of many embodiments of a system for acid mixing according to the disclosure.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms.

The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the figures and are not intended to limit the scope of the inventions or the appended claims. The terms "including" and "such as" are illustrative and not limitative. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally. Further, all parts and components of the disclosure that are capable of being physically embodied inherently include imaginary and real characteristics regardless of whether such characteristics are expressly described herein, including but not limited to characteristics such as axes, ends, inner and outer surfaces, interior spaces, tops, bottoms, sides, boundaries, dimensions (e.g., height, length, width, thickness), mass, weight, volume and density, among others.

Any process flowcharts discussed herein illustrate the operation of possible implementations of systems, methods, and computer program products according to various embodiments of the present disclosure. In this regard, each block in a flowchart may represent a module, segment, or portion of code, which can comprise one or more executable instructions for implementing the specified logical function (s). It should also be noted that, in some implementations, the function(s) noted in the block(s) might occur out of the order depicted in the figures. For example, blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Applicants have created new and useful devices, systems and methods for mixing or blending acid(s) with water, such as for use in connection with hydrocarbon formation fracturing (aka fracking or "fracing") in the oil and gas industry. A self-contained, automated system, such as disclosed herein, can increase job-site safety, consistency, and efficiency.

Figure 2:
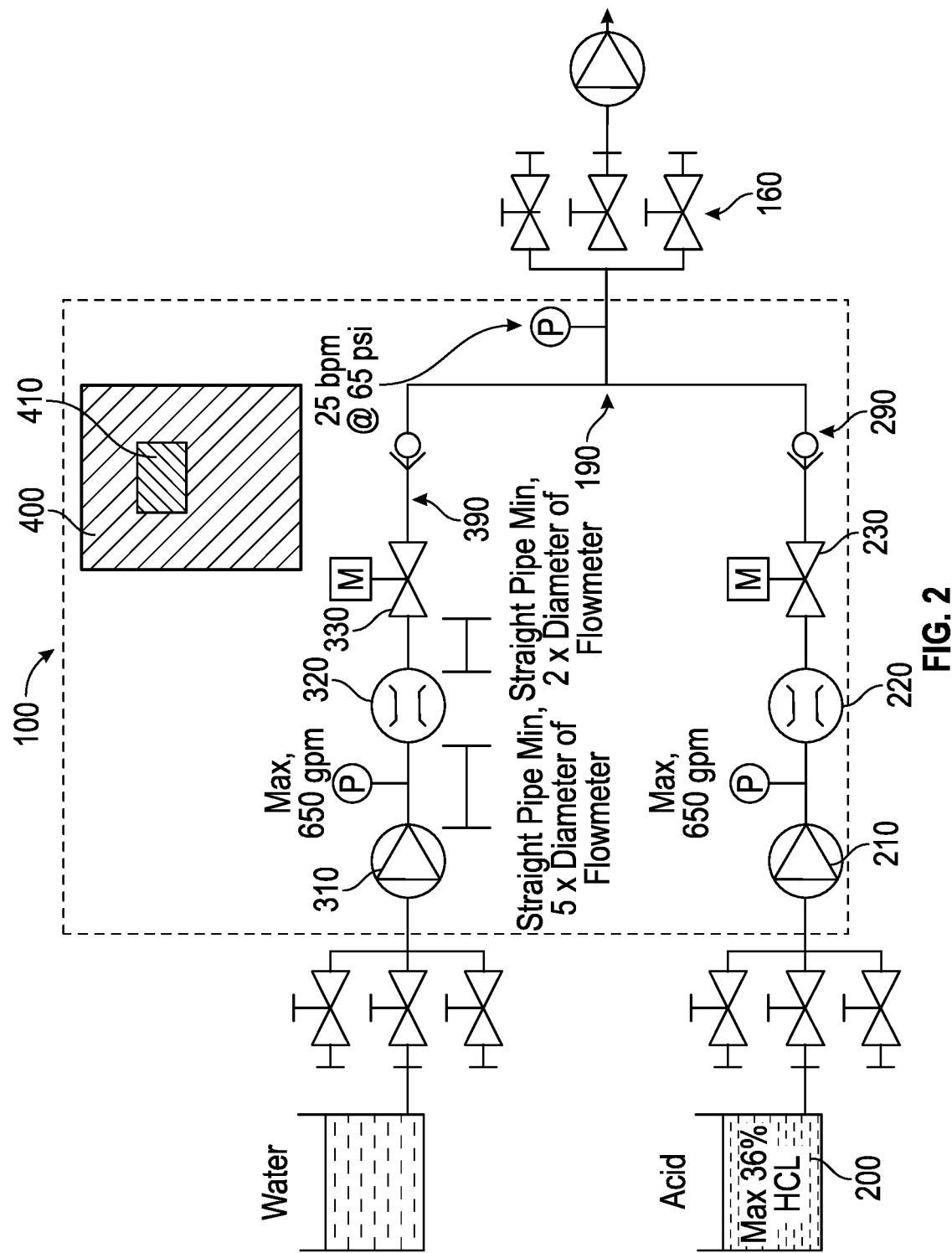
FIG. 2 is a process diagram of one of many embodiments of a system for acid mixing according to the disclosure.
Figure 3:
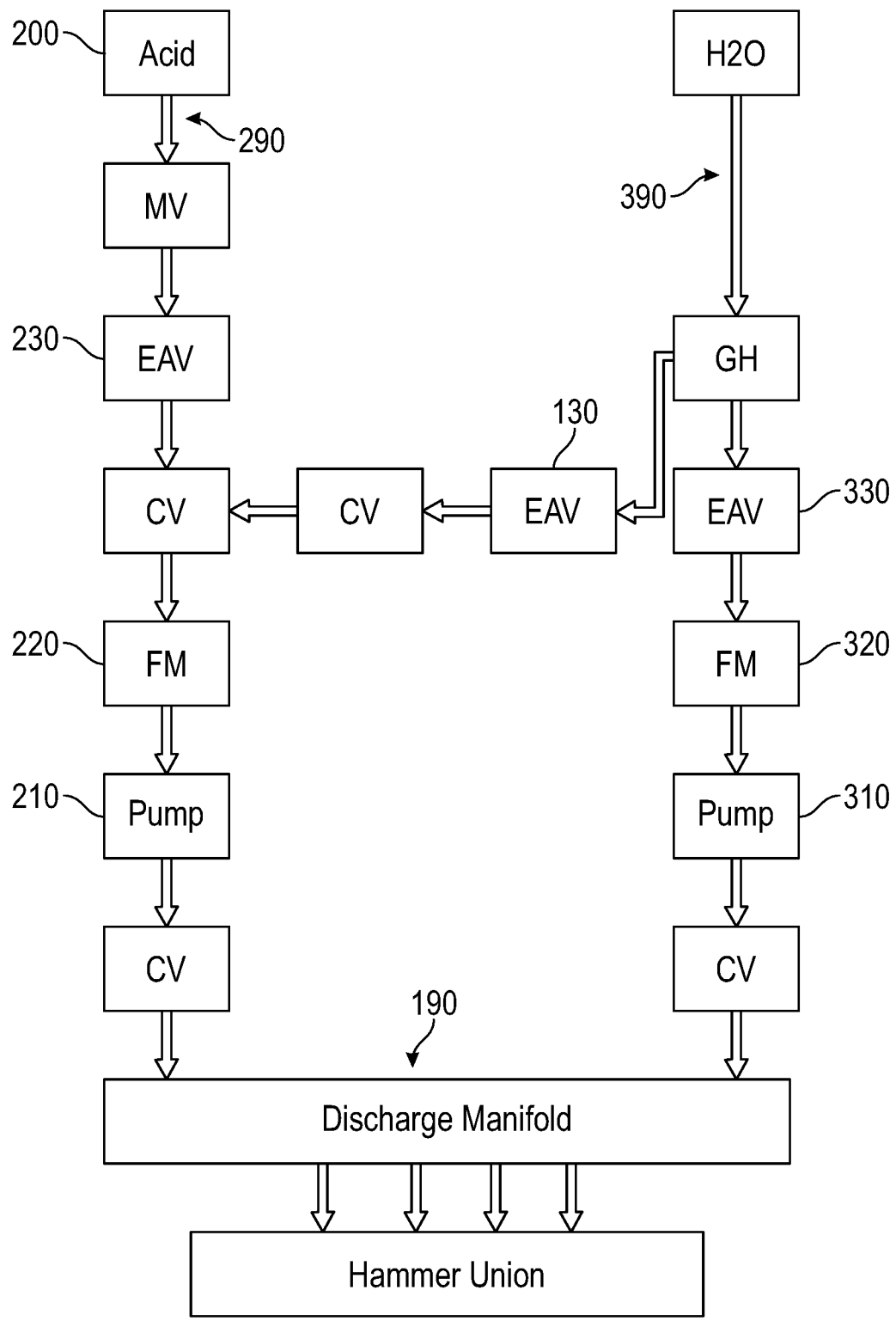
FIG. 3 is a flow diagram of one of many embodiments of a system for acid mixing according to the disclosure.
Figure 4:
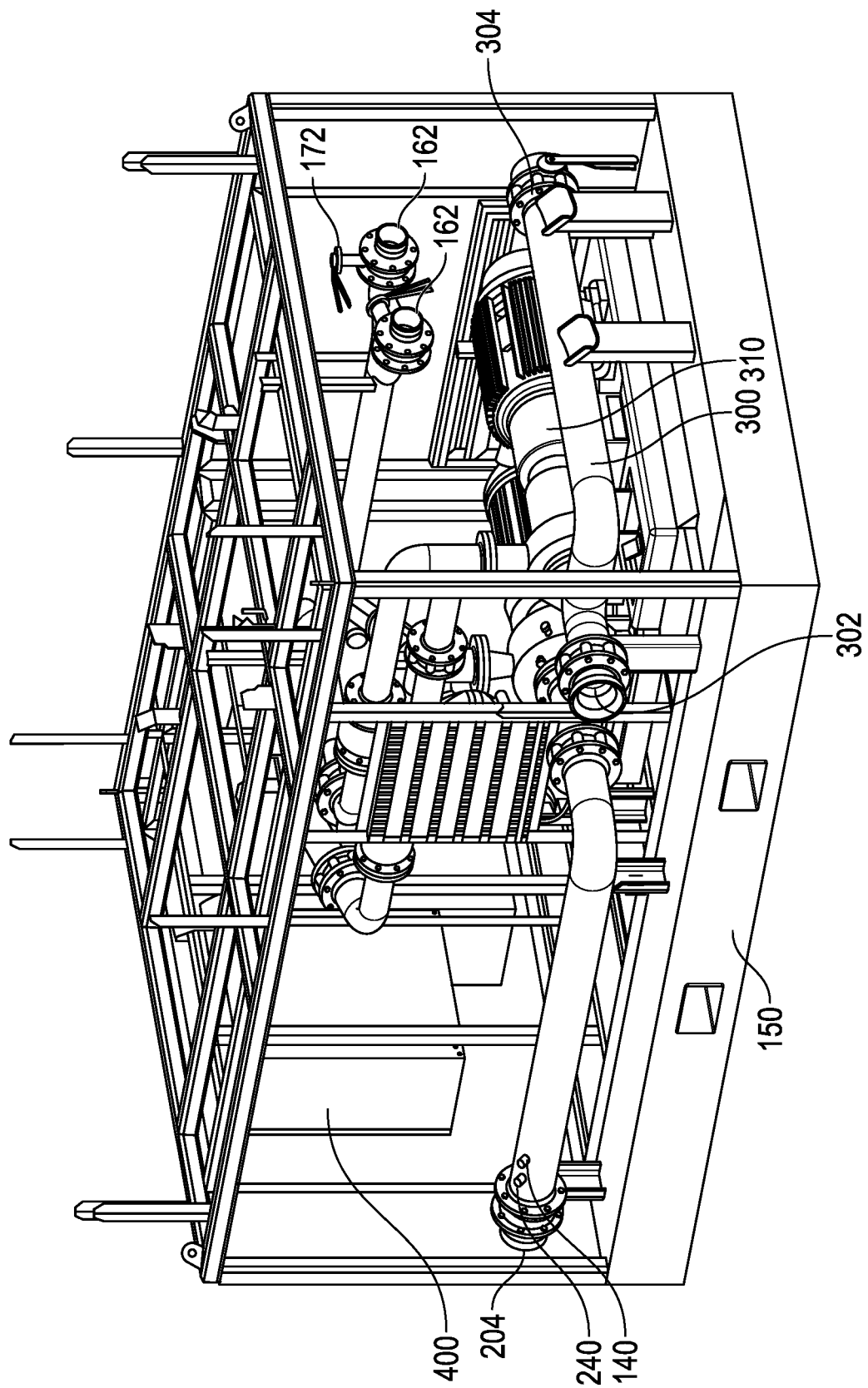
FIG. 4 is a partial perspective view of one of many embodiments of a system for acid mixing according to the disclosure.
Figure 5:
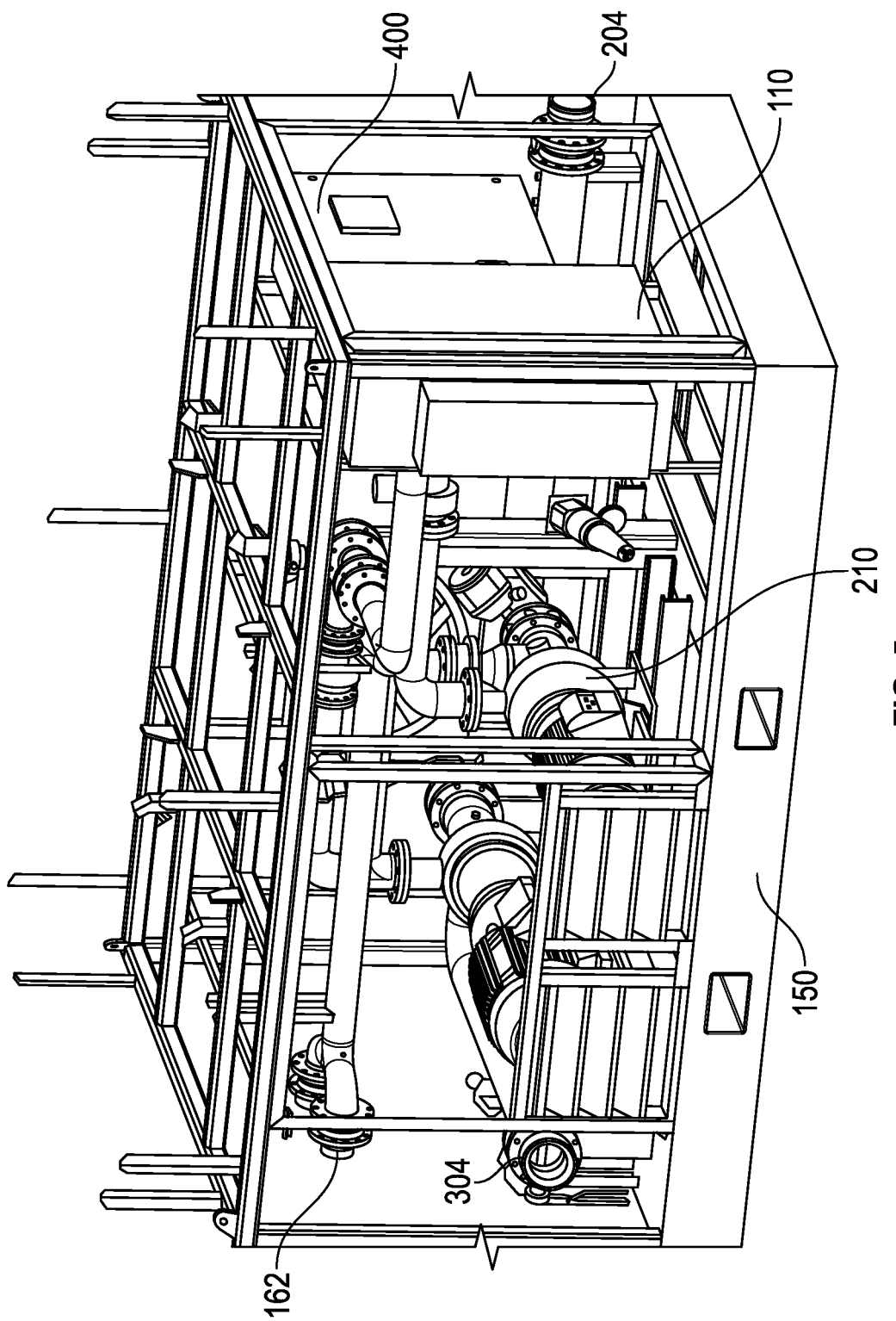
FIGS. 5-7 are additional partial perspective views of the system of FIG. 4.
Figure 6:
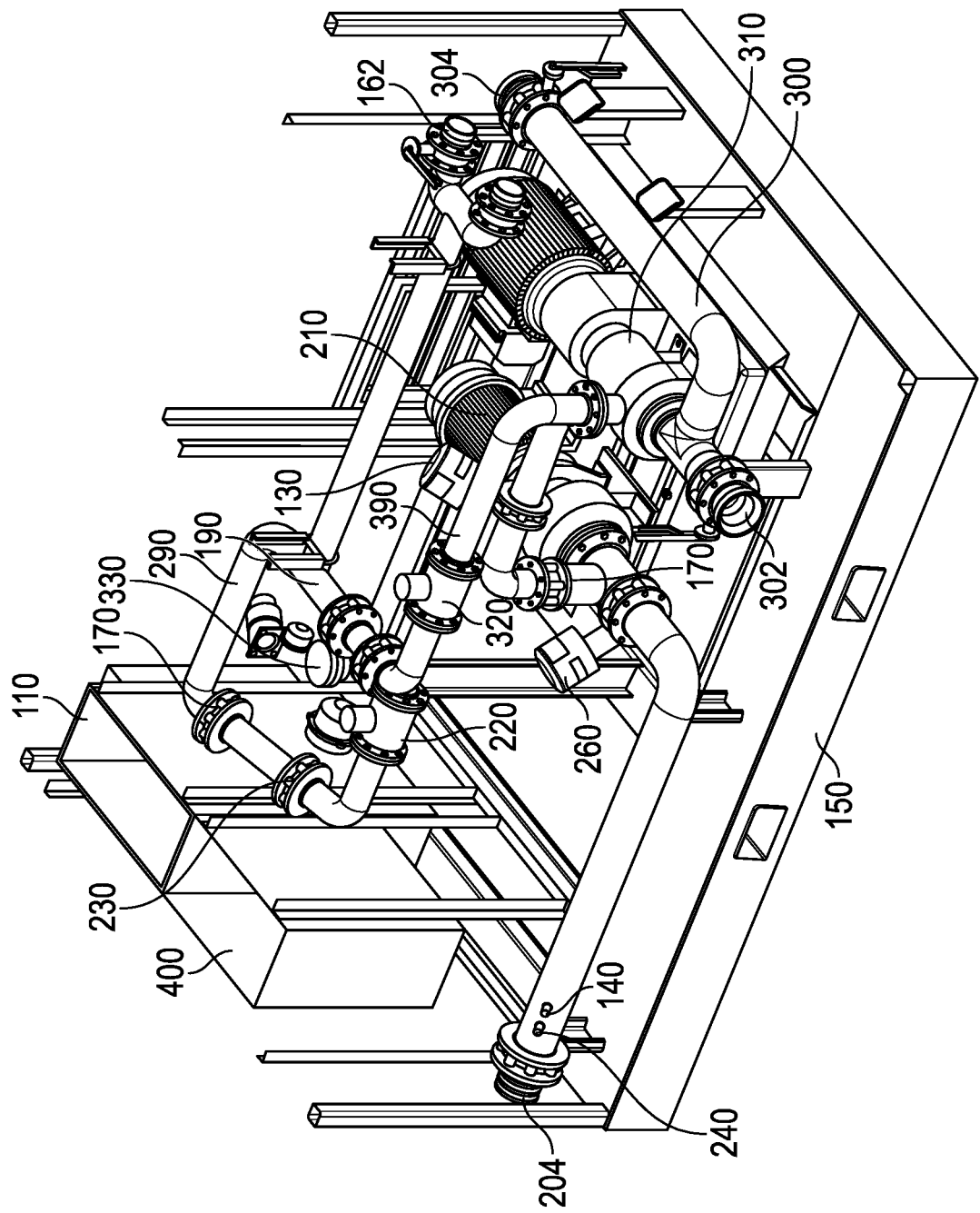
Figure 7:
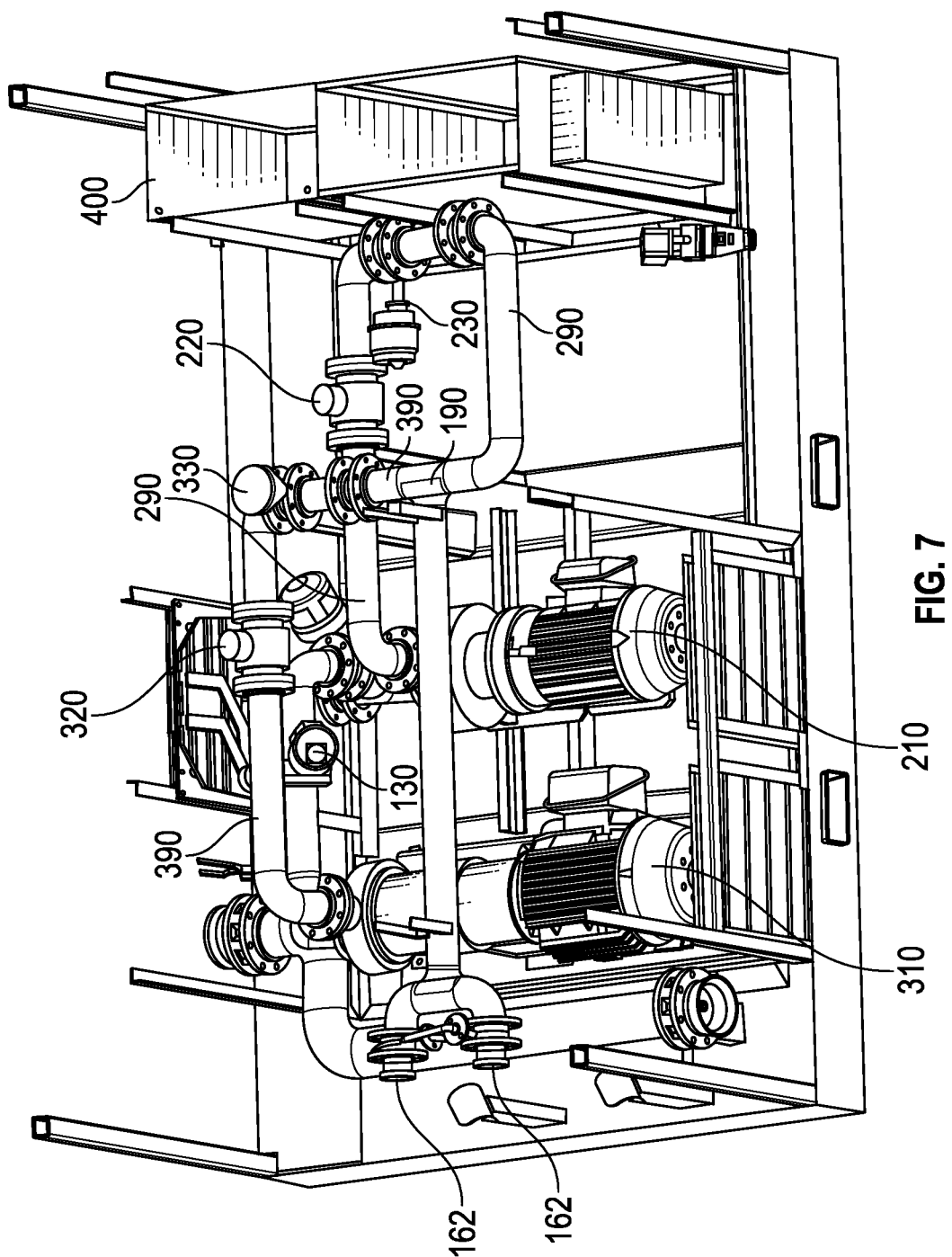
Figure 8:
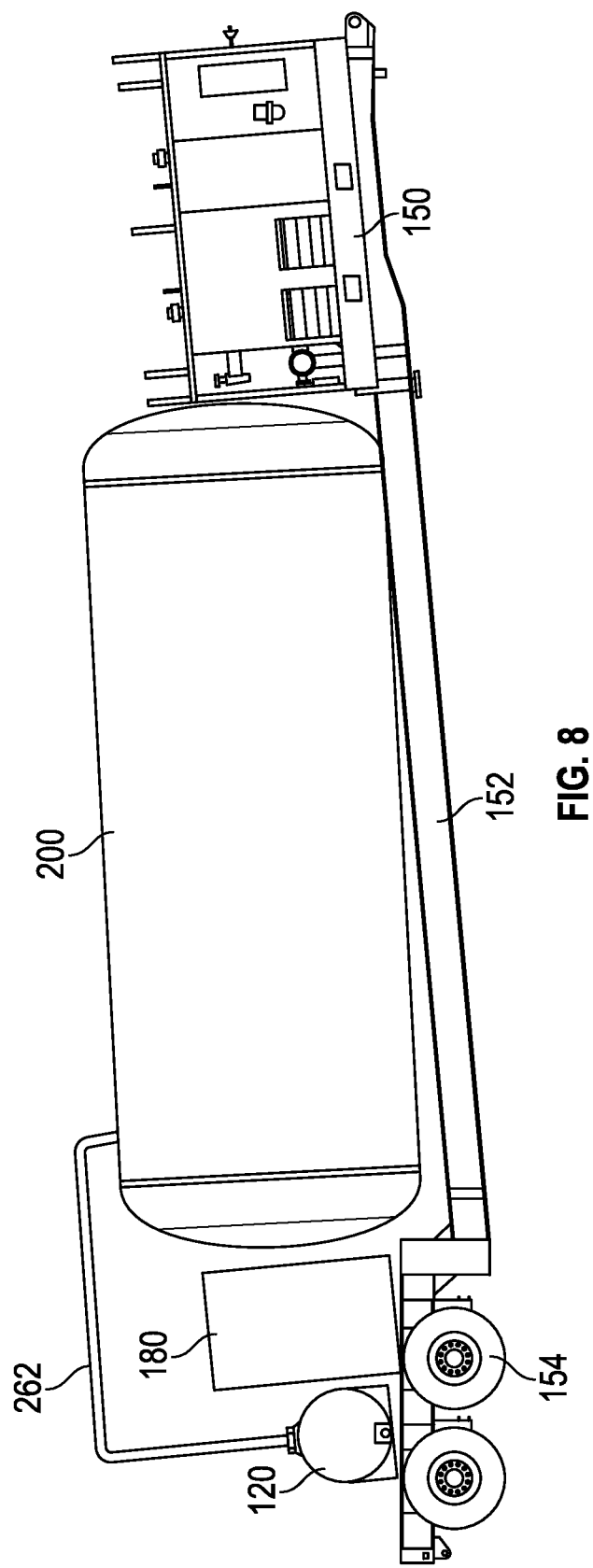
FIG. 8 is a side elevation view of one of many embodiments of a system for acid mixing according to the disclosure.
Figure 9:
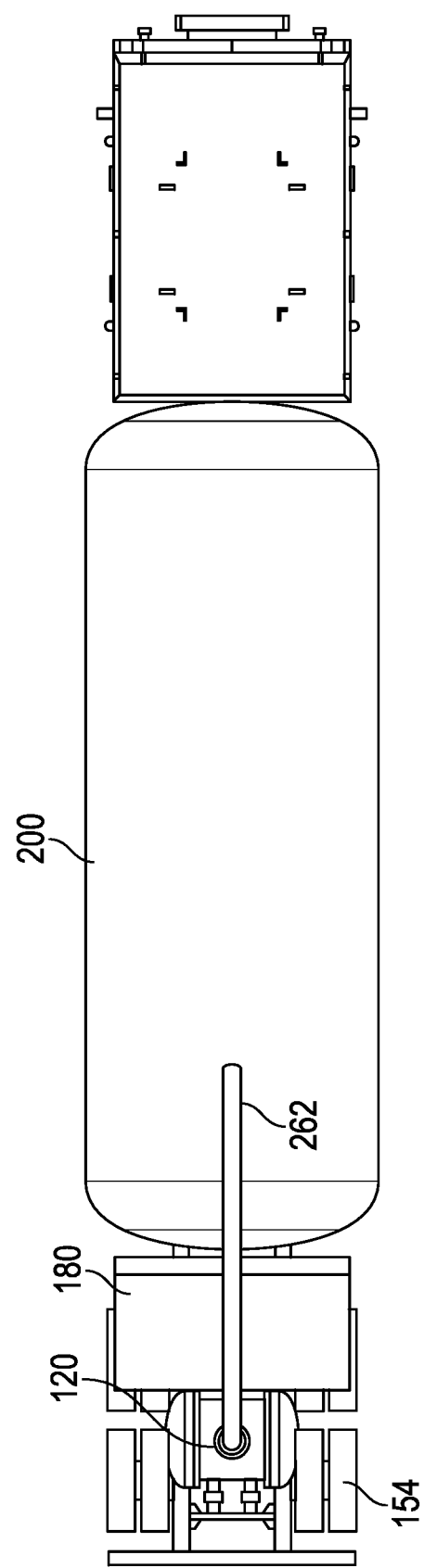
FIG. 9 is a top plan view of the system of FIG. 8.
Figure 10:
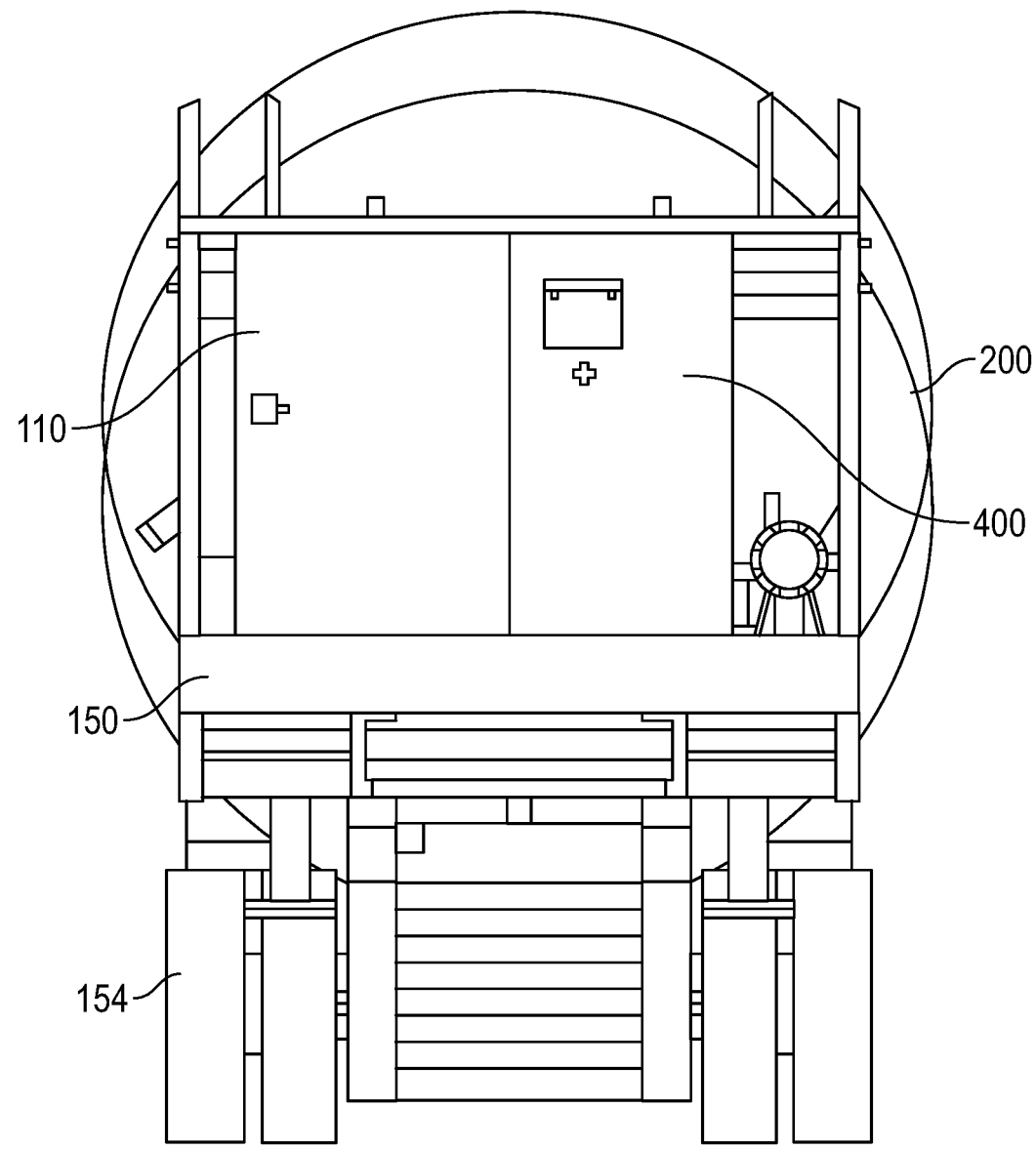
FIG. 10 is a front elevation view of the system of FIG. 8.
Figure 11:
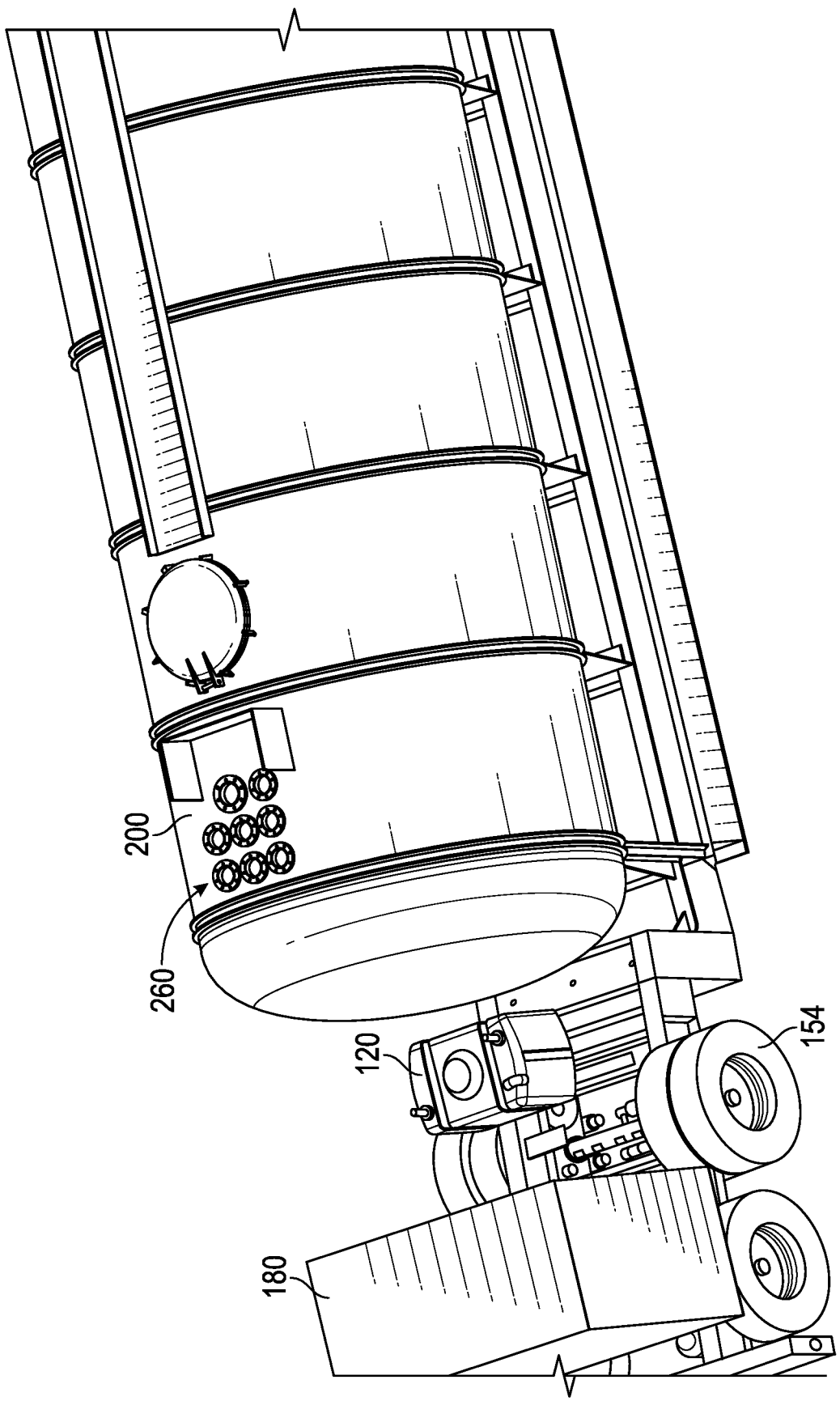
FIG. 11 is a partial perspective view of another one of many embodiments of a system for acid mixing according to the disclosure.
Figure 12:
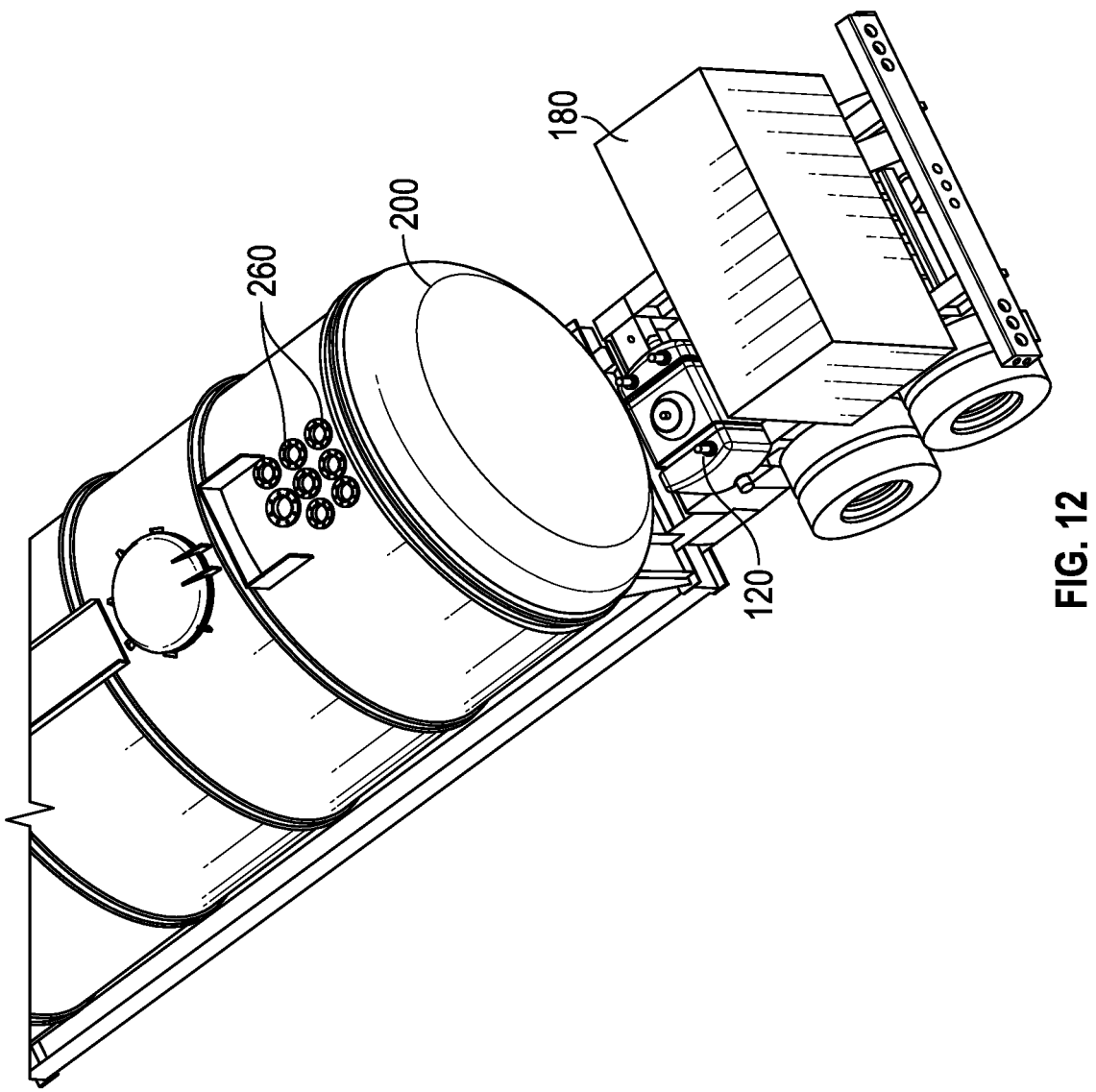
FIGS. 12-15 are additional partial perspective views of the system of FIG. 11.
Figure 13:
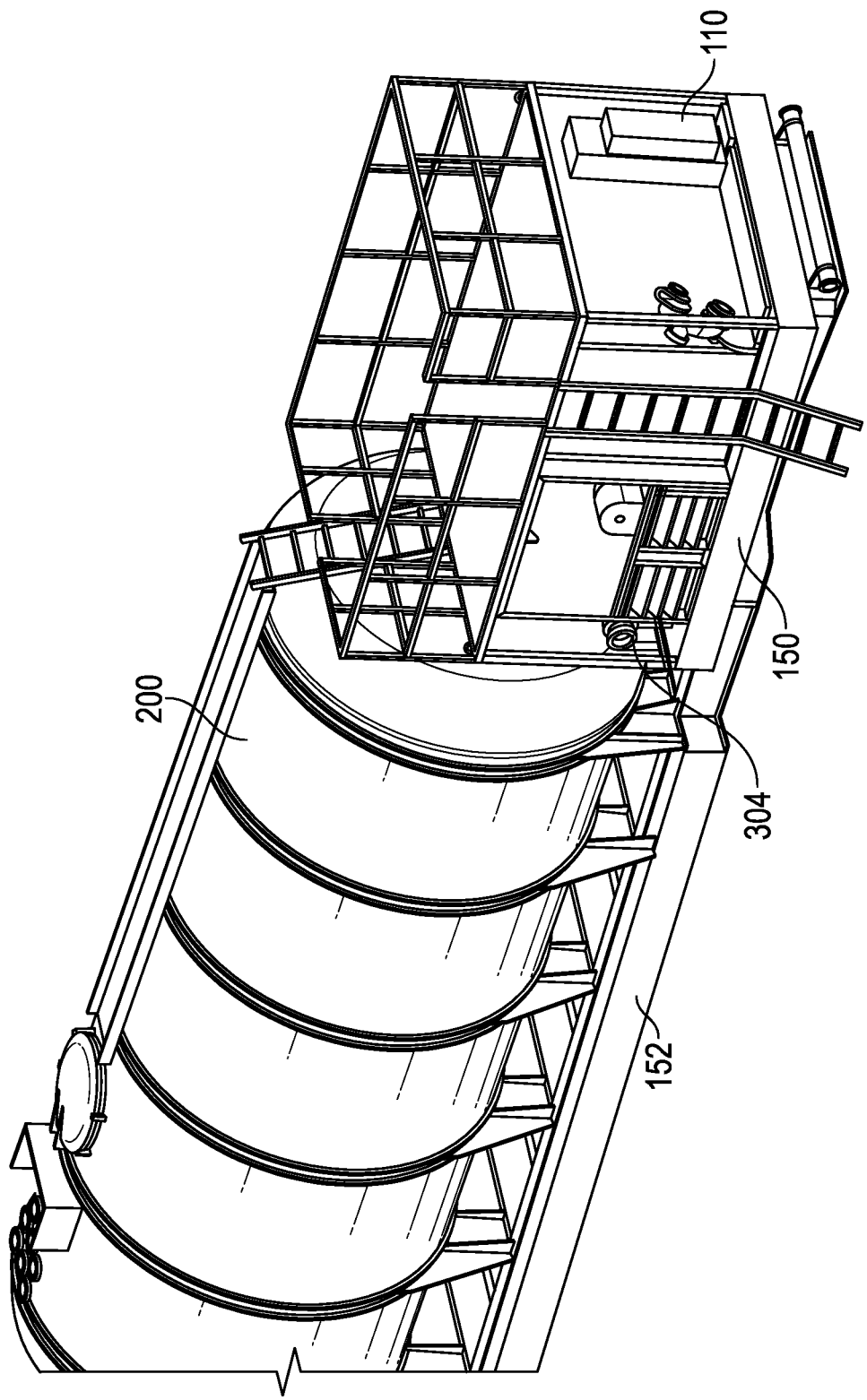
Figure 14:
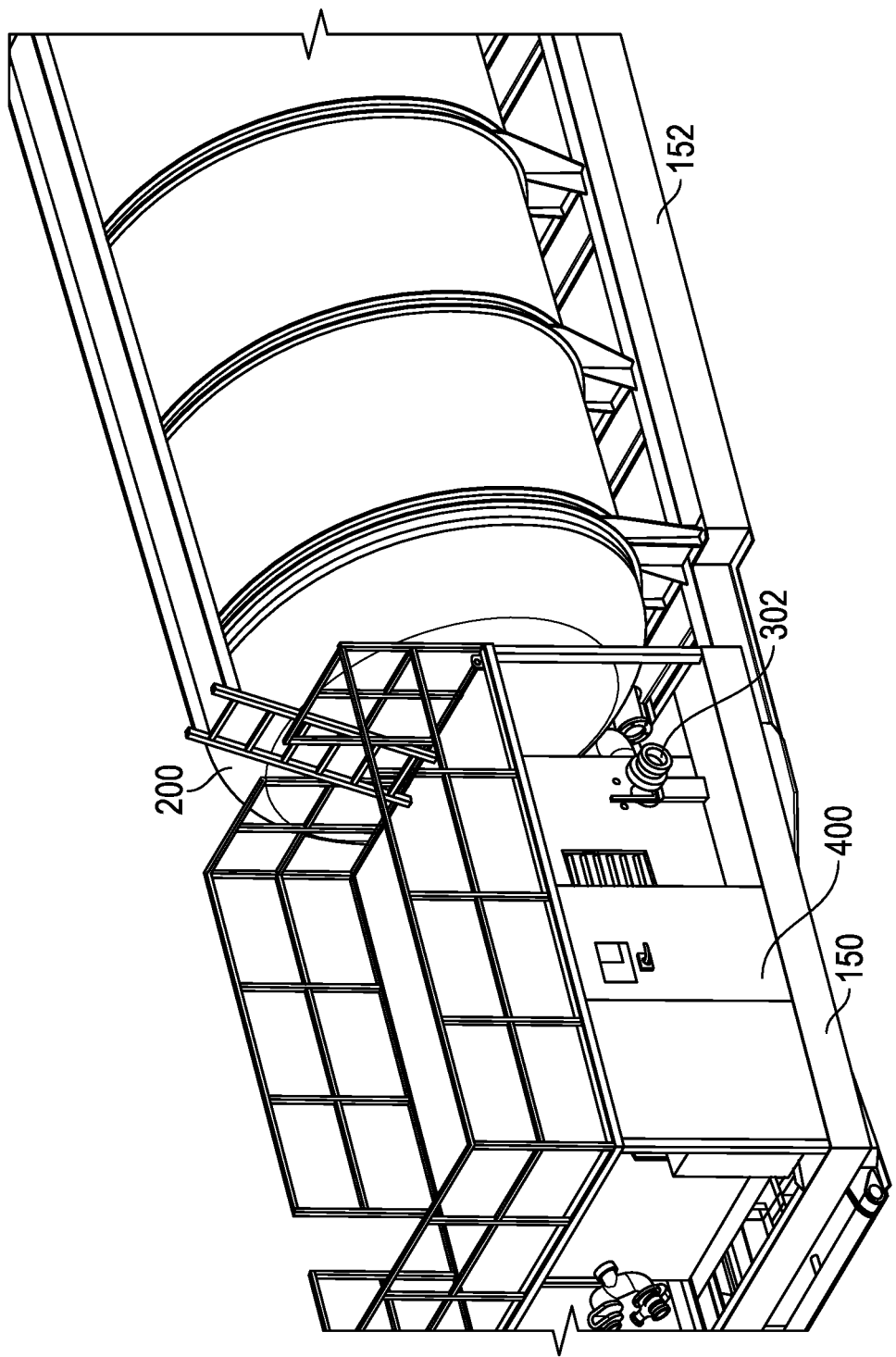
Figure 15:
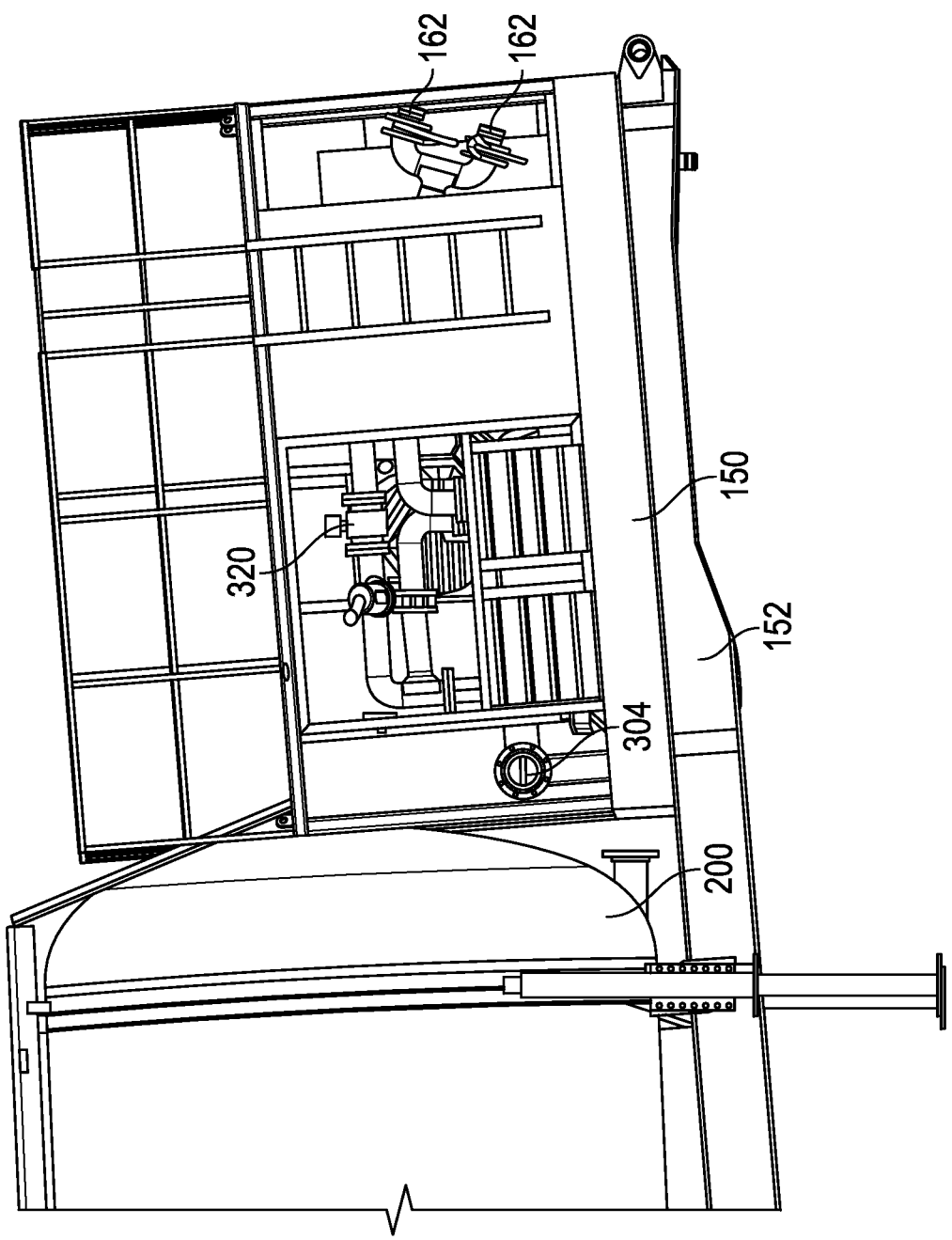
Figure 16:
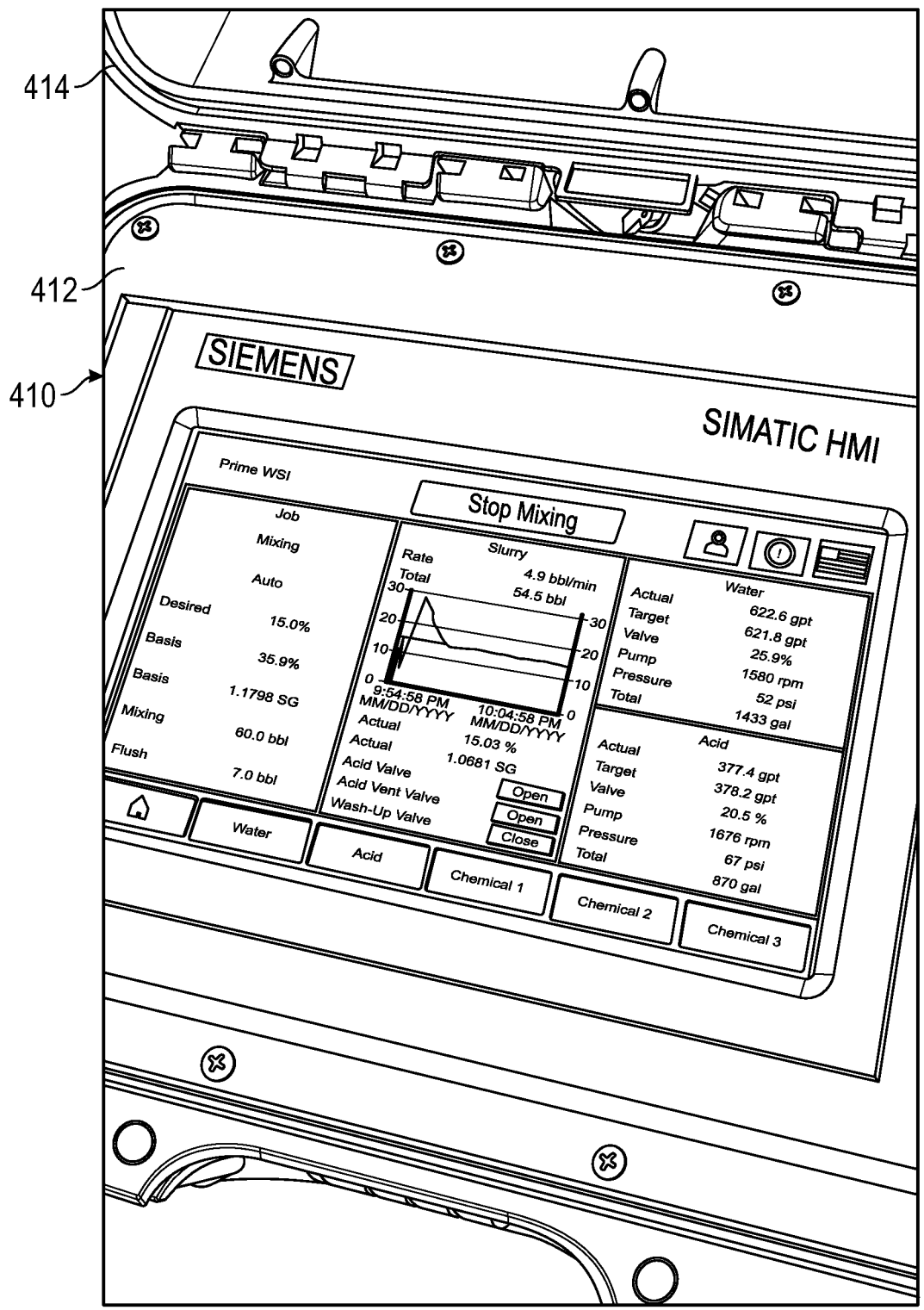
FIG. 16 is a partial perspective view of one of many embodiments of a controller for acid mixing according to the disclosure.

FIG. 1 is a schematic diagram of one of many embodiments of a system for acid mixing according to the disclosure. FIG. 2 is a process diagram of one of many embodiments of a system for acid mixing according to the disclosure. FIG. 3 is a flow diagram of one of many embodiments of a system for acid mixing according to the disclosure. FIG. 4 is a partial perspective view of one of many embodiments of a system for acid mixing according to the disclosure. FIGS. 5-7 are additional partial perspective views of the system of FIG. 4. FIG. 8 is a side elevation view of one of many embodiments of a system for acid mixing according to the disclosure. FIG. 9 is a top plan view of the system of FIG. 8. FIG. 10 is a front elevation view of the system of FIG. 8. FIG. 11 is a partial perspective view of another one of many embodiments of a system for acid mixing according to the disclosure. FIGS. 12-15 are additional partial perspective views of the system of FIG. 11. FIG. 16 is a partial perspective view of one of many embodiments of a controller for acid mixing according to the disclosure. FIGS. 1-16 are described in conjunction with one another.

In at least one embodiment, a system 100 according to the disclosure can output a predetermined acid/water mixture for pumping down a wellbore in connection with fracturing of a hydrocarbon formation. In at least one embodiment, system 100 can mix acid, water, other chemicals, or any combination thereof. In at least one embodiment, system 100 can include one or more tanks 200 for holding acid, one or more acid pumps 210 for pumping acid out of tank 200, one or more acid flow meters 220, one or more acid control valves 230, one or more water pumps 310 for pumping water, one or more water flow meters 320, one or more water control valves 330, one or more flush valves 130 to selectively flush system 100 with water, one or more controllers 400 configured to monitor flow meters 220, 230 and/or to control one or more of pumps 210, 310 and/or valves 130, 230, 330, or any combination thereof. In at least one embodiment, acid flow meter 220 and/or acid control valve 230 can be located downstream of acid pump 210. In at least one embodiment, acid control valve 230 can be an electronically controlled acid valve, such as a dosing valve, on/off valve, or other flow control valve. In at least one embodiment, water flow meter 320 and/or water control valve 330 can be located downstream of water pump 310. In at least one embodiment, water control valve 330 can be an electronically controlled water valve, such as a dosing valve, on/off valve, or other flow control valve. In at least one embodiment, flush valve can 130 be an electronically controlled valve, such as an on/off valve, for selectively permitting water to flow from downstream of water pump 310 to upstream of acid pump 210 to flush at least a portion of the system with water, such as after acid has flowed there through during mixing operations. In at least one embodiment, acid control valve 230, water control valve 330, flush valve 130, or any combination thereof can be controlled by controller 400 to control flow therethrough, such as by way of a valve actuator that moves a valve member to a fully open or on position, a fully closed or off position, or one or more throttled or partially open/closed positions there between. In at least one embodiment, an acid flow path 290 through, e.g., acid pump 210, acid flow meter 220, acid control valve 230, and related plumbing, can meet a water flow path 390, e.g., through water pump 310, water flow meter 320, water control valve 330, and related plumbing, at one or more mixture points 190 for producing an acid/water mixture.

In at least one embodiment, the entire system 100, or any portion thereof, can be mounted on a skid 150. In at least one embodiment, system 100 can deliver an acid/water mixture to one or more manifolds, one or more frac pumps, one or more outlet or discharge valves 160, one or more mixture outlet couplings 162, or any combination thereof. In at least one embodiment, system 100 can include one or more vapor recovery or scrubber units 120 coupled to tank 200, which can resist emission of acid vapors into the atmosphere. In at least one embodiment, scrubber unit 120 can be fluidically coupled to one or more vents 260 on top of tank 200, such as via one or more vent lines 262 or other conduits. In at least one embodiment, system 100 can include one or more variable frequency drives (VFD) 110 for controlling any or each of pumps 210, 310. In at least one embodiment, controller 400 can monitor and/or control one or more temperature sensors 240, which can be used to monitor a temperature of the acid at one or more points in the system or flow path, such as for accurately determining a specific gravity of the acid for mixing operations. In at least one embodiment, controller 400 can monitor and/or control one or more discharge valves 160, one or more level sensors 250, which may be used to monitor a level or quantity of acid in tank 200, one or more inlet valves 260, which may be used to selectively permit flow of the acid, water, and/or other chemicals, or any combination thereof. In at least one embodiment, system 100 can include one or more input or injection ports 140, which can be used to inject one or more chemicals into the mixture. In at least one embodiment, system 100 can include one or more other valves, such as one or more check valves 170 to control directional flow of the acid, water, and/or other chemicals, and/or one or more manually operated valves 172, such as to provide manual override or shutoff capabilities to one or more features of system 100.

In at least one embodiment, a system 100 for mixing acid from one or more tanks 200 with water according to the disclosure can include one or more skids 150, one or more water inlet lines 300, one or more water pumps 310 mounted to skid 150 for pumping water through or from water inlet line 300, one or more water flow meters 320, one or more water control valves 330, one or more acid pumps 210 mounted to skid 150 for pumping acid out of tank 200, one or more acid flow meters 220, one or more acid control valves 230, one or more flush valves 130, one or more controllers 400 to monitor flow meters 220, 320 and/or control one or more of pumps 210, 310 and valves 130, 160, 230, 260, 330, or any combination thereof.

In at least one embodiment, water inlet line 300 can include one or more first water inlet couplings 302 configured to receive water from a first side of skid 150 and one or more second water inlet couplings 304 configured to receive water from a second side of skid 150. In at least one embodiment, the first side of skid 150 is different from the second side. In at least one embodiment, the first side of the skid 150 is opposite from the second side.

In at least one embodiment, water flow meter 320 and/or water control valve 330 can be mounted to skid 150 downstream of water pump 310. In at least one embodiment, acid flow meter 220 and/or acid control valve 230 can be mounted to skid 150 downstream of acid pump 210. In at least one embodiment, flush valve 130 can be mounted to skid 150. In at least one embodiment, flush valve 130 can be electronically actuated and/or can selectively permit water to flow from downstream of water pump 310 to upstream of acid pump 210, which can occur automatically following one or more other flow operations. For example, in at least one embodiment, controller 400 can be configured to automatically open flush valve 130 after a predetermined volume or other amount of acid flow, which can flush all or a portion of the flow path downstream of valve 130 with water, such as all or a portion of the acid flow path, thereby flushing most or all acid from the flow paths and out of the system and helping ensure the safety of the system operator(s) and/or others. In at least one embodiment, controller 400 can be configured to automatically close flush valve 130 after one or more events, such as a flush time or other setting. In at least one embodiment, controller 400 can be configured to leave flush valve 130 open for a predetermined time period, until manually closed or shutoff (e.g., via an operator input to controller 400), or until system shut down, for instance. The aforementioned predetermined volumes, amounts, times and/or other variables can be or include any volumes, amounts, times or other values required or desired in accordance with an implementation of the disclosure.

In at least one embodiment, system 100 can include one or more acid inlet valves 260 upstream of acid pump 210. In at least one embodiment, flush valve 130 can selectively permit water to flow from downstream of water pump 310 to between acid pump 210 and acid inlet valve 260. In at least one embodiment, flush valve 130 can open when acid inlet valve 260 closes. For example, controller 400 can automatically open flush valve 130 when it (controller 400) closes acid inlet valve 260. In at least one embodiment, controller 400 can close acid inlet valve 260 and open flush valve 130 when a desired (e.g., target or selected) quantity of mixture has been dispensed. In at least one embodiment, controller 400 can close or throttle water control valve 330 when flush valve 130 is opened, to force water through acid pump 210, acid control valve 230, acid flow meter 220, or any combination thereof.

In at least one embodiment, controller 400 can automatically turn off pumps 210, 310 once a desired quantity of water has been pumped through acid control valve 230 and/or acid pump 210, such as to adequately flush system 100. In at least one embodiment, controller 400 can automatically turn off pumps 210, 310 once a desired quantity of water has been pumped through acid control valve 230 and/or acid pump 210 and one or more flow meters 220, 320 indicate a lack of flow, such as might be expected if an operator closed an input and/or output valve. In at least one embodiment, controller 400 can automatically turn off pumps 210, 310 once a desired quantity of water has been pumped through acid control valve 230 and controller 400 receives a stop command, such as from an operator, timer or otherwise.

In at least one embodiment, controller 400 can control any or both pumps 210, 310 to maintain a desired output pressure. For example, controller can control both pumps 210, 310 to maintain an output pressure of between 40 and 65 PSI (inclusive) downstream of the pumps independently of flow through pumps 210, 310.

In at least one embodiment, controller 400 can control water control valve 330 and acid control valve 230 to maintain a desired acid mixture. In at least one embodiment, system 100 can include one or more temperature sensors 240 allowing controller 400 to monitor a temperature of the acid. In at least one embodiment, controller 400 can compensate for a temperature of the acid, such as by throttling any or both of valves 230, 330.

In at least one embodiment, system 100 can include one or more generators 180 mounted to skid 150 for powering any or all of system 100, such as pumps 210, 310 and controller 400. In at least one embodiment, system 100 can include one or more acid inlet lines 202 having one or more acid inlet couplings 204 configured to receive acid from a third side of skid 150, which can be different than the first side and/or the second side. In at least one embodiment, tank 200 can be mounted to skid 150, such as on the third side of skid 150, which can be different than the first side and/or the second side. In at least one embodiment, tank 200 can be mounted to skid 150 adjacent to acid inlet coupling 204. In at least one embodiment, controller 400 can be mounted to skid 150, such as along a fourth side, different from the first side, the second side, the third side, or any combination thereof. In at least one embodiment, skid 150 can be enclosed on any or all sides. In at least one embodiment, skid 150 can be mobile, which can include being configured for movement by a crane, hoist or forklift, for example. In at least one embodiment, skid 150 can be mounted to, or be part of, a trailer 152, such as a semi-trailer, which can include one or more frame members, one or more axles, and two or more wheels 154. In at least one embodiment, one or more components of system 100, such as pumps 210, 310, flow meters 220, 320, valves 130, 160, 170, 230, 260, 330, sensors 240, 250, controller 400, and associated plumbing, wiring and support structure, or any combination thereof, can be mounted to skid 150. In at least one embodiment, skid 150 and/or tank 200 can be fixedly or removably mounted to trailer 152. In at least one embodiment, one or more components of system 100, such as tank 200, pumps 210, 310, flow meters 220, 320, valves 130, 160, 170, 230, 260, 330, sensors 240, 250, controller 400, and associated plumbing, wiring and support structure, or any combination thereof, can be mounted directly to trailer 152.

In at least one embodiment, a control system for mixing acid from one or more tanks 200 with water can include one or more water pump control outputs to control one or more speeds of one or more water pumps 310, one or more water flow meters 320 to monitor a water flow rate of the water through water pump 310, one or more water control valves 330 to control the water flow rate, one or more acid pump control outputs to control one or more speeds of one or more acid pumps 210, one or more acid flow meters 220 to monitor an acid flow rate of the acid from tank 200 through acid pump 210, one or more acid control valves 230 to control the acid flow rate, one or more acid inlet valves 260 to selectively permit acid to flow from tank 200, one or more temperature sensors 240 to monitor one or more acid temperatures, one or more flush valves 130 to selectively permit water to flow from downstream of water pump 310 to upstream of acid pump 210, one or more user interfaces having one or more input and/or output devices 410, such as a touchscreen, to receive and/or display pertinent data, one or more controllers 400 to monitor flow meters 220, 320 and/or sensors 240 and control any of valves 130, 160, 230, 260, 330 and/or pumps 210, 310, or any combination thereof. In at least one embodiment, input device 410 can receive an acid specific gravity, a desired acid concentration, a desired mixture volume, a desired flush volume, or any combination thereof. In at least one embodiment, controller 400 can calculate an acid to water ratio to achieve the desired acid concentration using the acid specific gravity and/or the temperature of the acid, control either or both pumps 210, 310 to maintain a desired output pressure, control water control valve 330 and/or acid control valve 230 to maintain the desired acid concentration, such as until the desired mixture volume is reached, control acid inlet valve 260 and/or flush valve 130 to automatically stop acid flow from tank 200 and/or trigger a flush cycle, or any combination thereof. In at least one embodiment, the flush cycle can flush acid flow meter 220, acid control valve 230, acid pump 210 (or the fluid end thereof), corresponding plumbing and/or other flow components, or any combination thereof, with water, such as after a desired mixture volume is reached.

In at least one embodiment, the controller 400 can be mounted to the skid 150 and/or the trailer 152. In at least one embodiment, the user interface 410 can be mounted to the controller 400. In at least one embodiment, the user interface 410 can be mounted in a control box 412, which can be mounted to the controller 400, the skid 150, the trailer 152, or any combination thereof. In at least one embodiment, the control box 412 can be separate or separable from the controller 400. In at least one embodiment, the control box 412 can be weather resistant and/or waterproof, and can include a seal 414 such as a gasket or O-ring to provide water resistance, such as when closed. In at least one embodiment, the controller 400 can communicate with the user interface 410 though a wired and/or wireless connection. In at least one embodiment, the user interface 410 can allow a user or operator to control, or otherwise interact with, the system 100 remotely from the skid 150 and/or other components of the system 100.

In at least one embodiment, a method of operating a system 100 for mixing acid from a tank 200 with water according to the disclosure can include filling the tank 200 with acid (such as at a supplier location), reviewing specifications of the acid (such as provided from the acid supplier and/or at the supplier location), sampling the acid in the tank 200 to confirm the acid in the tank 200 meets the specifications, confirming that the tank 200 holds a desired quantity of the acid, inputting a specific gravity of the acid from the specifications into a controller 400, inputting a desired acid concentration into the controller 400, inputting a desired mixture volume into the controller 400, inputting a desired flush volume into the controller 400, or any combination thereof. In at least one embodiment, the flush volume can include a plumbing volume of the system 100, any discharge hoses, such as from the system 100 to a frac pump, the frac pumps suction plumbing, or any combination thereof. In at least one embodiment, an operator can confirm the acid in the tank 200 meets the specifications using a hydrometer. In at least one embodiment, an operator can confirm that the tank 200 holds a desired quantity of acid using a tank level sensor 250. A mixing operation of the system 100 can be initiated by an operator hitting a start button of the controller 400, which can cause the system 100 to provide the desired mixture volume at the desired acid concentration.

In at least one embodiment, a method according to the disclosure, such as a method of operating a system 100 for mixing acid from a tank 200 with water, can include inputting an acid specification into a controller 400, inputting a desired acid concentration into the controller 400, inputting a desired mixture volume into the controller 400, or any combination thereof. In at least one embodiment, the method can include initiating, via the controller 400, a mixing operation to provide a desired acid/water mixture volume at the desired acid concentration. In at least one embodiment, the method can include filling the tank 200 at least partially with acid, such as at a supplier location, reviewing one or more specifications provided at a supplier location or otherwise, sampling the acid in the tank 200 to confirm the acid in the tank 200 meets one or more specifications, confirming that the tank 200 holds a desired quantity of acid (e.g., enough acid for a given implementation of the disclosure, which can be any amount of acid desired or required for such an implementation), or any combination thereof. In at least one embodiment, the method can include inputting a desired flush volume into the controller 400. In at least one embodiment, the flush volume can include or be based at least partially on a plumbing volume of the system 100 (a system plumbing volume) or a portion thereof, such as one or more acid flow paths, acid/water mixture flow paths, or other system flow paths.

In at least one embodiment, the desired acid concentration can be 12%, 15%, 20%, or any other percentage between 5% and 50%, for example. In at least one embodiment, the desired mixture volume can be 500 gallons, 1000 gallons, 2000 gallons, or any other quantity between 50 gallons and 5000 gallons. The foregoing values are examples only and the acid concentration and/or mixture volume can be or include any acid concentration and/or mixture volume required or desired according to an implementation of the disclosure.

In at least one embodiment, a method according to the disclosure can include initiating a mixing operation by an operator actuating a start button of a controller 400, opening a water control valve 330 and turning on a water pump 310, opening an acid control valve 230 and turning on an acid pump 210, monitoring an acid temperature, throttling the pumps 210, 310 to maintain a desired output pressure, throttling the valves 230, 330 to maintain a desired mixture accounting for the acid temperature, automatically flushing the acid control valve 230 and the acid pump 210 with water from the water pump 310 when a desired quantity of mixture has been dispensed, or any combination thereof. In at least one embodiment, the controller 400 can autonomously and/or automatically open the water control valve 330 and turn on the water pump 310, open the acid control valve 230 and turn on the acid pump 210, monitor the acid temperature, throttle the pumps 210, 310 to maintain the desired output pressure, throttle the valves 230, 330 to maintain the desired mixture accounting for the acid temperature, automatically flush the acid control valve 230 and the acid pump 210 with water from the water pump 330 once the desired quantity of mixture has been dispensed, or any combination thereof. In at least one embodiment, controller 400 can include or have access to one or more sets of data, such as a lookup table, and controller 400 can control one or more aspects of system 100, such as acid flow, water flow and/or mixture flow, based on data from the a data set. For example, in at least one embodiment, system 100 can pull or blend acid based on specific gravity, acid temperature, tank level or pressure (which can include having one or more pressure sensors, e.g., in communication with tank 200), desired or target acid percentage, desired or target outlet pressure, or any combination thereof. In at least one embodiment, controller 400 can take a series of acid (and/or other) temperature readings during mixing and/or flow operations, repeatedly recalculate one or more formulas based on the temperature readings during mixing and/or flow operations, and adjust one or more valve positions and/or flow rates based on the recalculations during mixing and/or flow operations, thereby making real-time adjustments during mixing and/or flow operations for achieving the target acid and/or mixture amounts, increasing efficiency and accuracy, and keeping personnel out of harm's way by minimizing or eliminating the need for manual valve adjustments.

In at least one embodiment, controller 400 can be preset for a given implementation of the disclosure, whether on site or off site of the operations. For instance, as a nonlimiting example (which is but one of many), if a given job at hand calls for 2000 gallons of 15% hydrochloric acid (HCL) and 10 barrels of flush water, controller 400 can be programmed such that, after the target amount of acid is pumped, controller 400 automatically swaps the valves and pumps the target amount of flush water. In at least one embodiment, controller 400 can continue to pump flush water until, for example, the discharge valve is shut or a stop button is pressed.

As will be appreciated by one of ordinary skill in the art having the benefits of the present disclosure, aspects of the embodiments can be embodied as a system, method or computer program product. Accordingly, aspects of the present embodiments can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing. Computer program code for carrying out operations for aspects of the present disclosure can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present disclosure can be and/or are described with reference to flowchart illustrations and/or block diagrams of methods, apparatus (systems) and computer program products according to embodiments of the disclosure. Each block of a flowchart illustration and/or block diagram, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions can also be stored in a computer readable medium (which can be or include any non-transitory computer readable media) that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions can also be loaded onto a computer, other programmable data processing apparatus, or other devices to cause a series of operational steps to be performed on the computer, other programmable apparatus or other device(s) to produce a computer implemented process such that the instructions which execute on the computer or other programmable apparatus provide processes for implementing the functions/acts specified in a flowchart and/or block diagram block or blocks.

In at least one embodiment, a system for mixing acid and water can include a tank for holding acid, an acid pump for pumping acid out of the tank, an acid flow meter, an acid control valve, a water pump for pumping water, a water flow meter, a water control valve, a flush valve to selectively flush the system with water, a controller configured to monitor the flow meters and control the pumps and the valves, or any combination thereof. In at least one embodiment, the acid flow meter and/or the acid control valve can be located downstream of the acid pump. In at least one embodiment, the acid control valve can be an electronically controlled acid valve. In at least one embodiment, the water flow meter and/or the water control valve can be located downstream of the water pump. In at least one embodiment, the water control valve can be an electronically controlled water valve.

In at least one embodiment, the flush valve can be an electronically controlled flush valve configured to selectively permit water to flow from downstream of the water pump to upstream of the acid pump. In at least one embodiment, the acid control valve, the water control valve, the flush valve, or any combination thereof can be throttled by the controller to control flow therethrough.

In at least one embodiment, the entire system, or any portion thereof, can be mounted on a skid. In at least one embodiment, the system can deliver an acid/water mixture to a manifold, a frac pump, an output valve, or any combination thereof. In at least one embodiment, the system can include a vapor recovery unit coupled to the tank, which can resist emission of acid vapors into the atmosphere. In at least one embodiment, the system can include a variable frequency drive (VFD) for any or each pump. In at least one embodiment, the system can output a predetermined acid/water mixture for pumping down a wellbore in connection with fracturing of a hydrocarbon formation.

In at least one embodiment, a skid mounted system for mixing acid from a tank with water can include a skid, a water inlet line, a water pump mounted to the skid for pumping water from the water inlet line, a water flow meter, a water control valve, an acid pump mounted to the skid for pumping acid out of the tank, an acid flow meter, an acid control valve, a flush valve, a controller to monitor the flow meters and control the pumps and the valves, or any combination thereof.

In at least one embodiment, the water inlet line can include a first water inlet coupling configured to receive water from a first side of the skid and a second water inlet coupling configured to receive water from a second side of the skid. In at least one embodiment, the first side is different from the second side. In at least one embodiment, the first side is opposite from the second side.

In at least one embodiment, the water flow meter and/or water control valve can be mounted to the skid downstream of the water pump. In at least one embodiment, the acid flow meter and/or the acid control valve can be mounted to the skid downstream of the acid pump. In at least one embodiment, the flush valve can be an electronically controlled flush valve mounted to the skid. In at least one embodiment, the flush valve can selectively permit water to flow from downstream of the water pump to upstream of the acid pump.

In at least one embodiment, the system can include an acid inlet valve upstream of the acid pump. In at least one embodiment, the flush valve can selectively permit water to flow from downstream of the water pump to between the acid pump and the acid inlet valve. In at least one embodiment, the flush valve can open when the acid inlet valve closes. For example, the controller can automatically open the flush valve when it (the controller) closes the acid inlet valve. In at least one embodiment, the controller can close the acid inlet valve and open the flush valve when a desired quantity of mixture has been dispensed. In at least one embodiment, the controller can close or throttle the water control valve when the flush valve is opened, to force water through the acid pump, acid control valve, acid flow meter, or any combination thereof.

In at least one embodiment, the controller can automatically turn off the pumps once a desired quantity of water has been pumped through the acid control valve and the acid pump, such as to adequately flush the system. In at least one embodiment, the controller can automatically turn off the pumps once a desired quantity of water has been pumped through the acid control valve and the acid pump and the flow meters indicate a lack of flow, such as might be expected if an operator closed in input and/or output valve. In at least one embodiment, the controller can automatically turn off the pumps once a desired quantity of water has been pumped through the acid control valve and the controller receives a stop command, such as from an operator.

In at least one embodiment, the controller can control both pumps to maintain a desired output pressure. For example, the controller can control both pumps to maintain an output pressure of between 40 and 65 PSI downstream of the pumps independently of flow through the pumps.

In at least one embodiment, the controller can control the water control valve and the acid control valve to maintain a desired acid mixture. In at least one embodiment, the system can include a temperature sensor allowing the controller to monitor a temperature of the acid. In at least one embodiment, the controller can compensate for a temperature of the acid, such as by throttling the acid valve.

In at least one embodiment, the system can include a generator mounted to the skid for powering the pumps and the controller. In at least one embodiment, the system can include an acid inlet line having an acid inlet coupling configured to receive acid from a third side of the skid, which can be different than the first side and/or the second side. In at least one embodiment, the tank and/or the skid can be mounted to a trailer, such as with the tank adjacent the third side of the skid, which can be different than the first side and/or the second side. In at least one embodiment, the tank can be mounted next to the skid adjacent the acid inlet coupling. In at least one embodiment, the controller can be mounted to the skid, such as along a fourth side, different from the first side, the second side, the third side, or any combination thereof.

In at least one embodiment, a control system for mixing acid from a tank with water can include a water pump control output to control a first speed of a water pump, a water flow meter to monitor a water flow rate of the water through the water pump, a water control valve to control the water flow rate, an acid pump control output to control a second speed of an acid pump, an acid flow meter to monitor an acid flow rate of the acid from the tank through the acid pump, an acid control valve to control the acid flow rate, an acid inlet valve to selectively permit acid to flow from the tank, a temperature sensor configured to monitor a temperature of the acid, a flush valve to selectively permit water to flow from downstream of the water pump to upstream of the acid pump, an input device to receive pertinent data, a controller to monitor the flow meters and/or sensor and control any of the valves and/or pumps, or any combination thereof. In at least one embodiment, the input device can receive an acid specific gravity, a desired acid concentration, a desired mixture volume, a desired flush volume, or any combination thereof. In at least one embodiment, the controller can calculate an acid to water ratio to achieve the desired acid concentration using the acid specific gravity and/or the temperature of the acid, control either or both pumps to maintain a desired output pressure, control the water control valve and/or the acid control valve to maintain the desired acid concentration, until the desired mixture volume is reached, control the acid inlet valve and/or the flush valve to automatically stop acid flow from the tank and/or trigger a flush cycle, or any combination thereof. In at least one embodiment, the flush cycle can flush the acid flow meter, the acid control valve, the acid pump, or any combination thereof with water, such as after the desired mixture volume is reached.

In at least one embodiment, a method of operating a system for mixing acid from a tank with water can include filling the tank with acid (such as at a supplier location), reviewing specifications of the acid (such as provided from the acid supplier and/or at the supplier location), sampling the acid in the tank to confirm the acid in the tank meets the specifications, confirming that the tank holds a desired quantity of the acid, inputting a specific gravity of the acid from the specifications into a controller, inputting a desired acid concentration into the controller, inputting a desired mixture volume into the controller, inputting a desired flush volume into the controller, or any combination thereof. In at least one embodiment, the flush volume can include a plumbing volume of the system, any discharge hoses, such as from the system to a frac pump, the frac pumps suction plumbing, or any combination thereof. A mixing operation of the system can be initiated by an operator hitting a start button of the controller, which can cause the system to provide the desired mixture volume at the desired acid concentration.

In at least one embodiment, a method of operating a system for mixing acid from a tank with water can include inputting an acid specification into a controller, inputting a desired acid concentration into the controller, inputting a desired mixture volume into the controller, or any combination thereof. In at least one embodiment, the method can include initiating, through the controller, a mixing operation to provide the desired mixture volume at the desired acid concentration. filling the tank with acid at a supplier location, reviewing specifications provided at the supplier location, sampling the acid in the tank to confirm the acid in the tank meets the specifications, confirming that the tank holds a desired quantity of the acid, or any combination thereof. In at least one embodiment, the method can include inputting a desired flush volume into the controller, the flush volume including a system plumbing volume.

In at least one embodiment, a method of operating a system for mixing acid from a tank with water can include initiating a mixing operation by an operator hitting a start button of a controller, opening a water control valve and turning on a water pump, opening an acid control valve and turning on an acid pump, monitoring an acid temperature, throttling the pumps to maintain a desired output pressure, throttling the valves to maintain a desired mixture accounting for the acid temperature, automatically flushing the acid control valve and the acid pump with water from the water pump when a desired quantity of mixture has been dispensed, or any combination thereof. In at least one embodiment, the controller can autonomously and/or automatically open the water control valve and turn on the water pump, open the acid control valve and turn on the acid pump, monitor the acid temperature, throttle the pumps to maintain the desired output pressure, throttle the valves to maintain the desired mixture accounting for the acid temperature, automatically flush the acid control valve and the acid pump with water from the water pump once the desired quantity of mixture has been dispensed.

In at least one embodiment, a method according to the disclosure, such as a method of mixing acid with water or a method of making, producing, pumping or otherwise providing a mixture of acid and water, can include opening one or more valves, such as a water control valve, turning on one or more pumps, such as a water pump, opening one or more other valves, such as an acid control valve, and turning on one or more other pumps, such as an acid pump. In at least one embodiment, a method can include monitoring one or more temperatures, such as an acid temperature. In at least one embodiment, a method can include throttling or otherwise controlling one or more pumps, such as to maintain one or more target pressures or other pressures. In at least one embodiment, a method can include throttling or otherwise controlling one or more valves, such as to maintain an acid/water mixture, which can include accounting for or otherwise adjusting one or more variables in light of one or more temperatures, such as one or more acid temperatures. In at least one embodiment, a method can include flushing one or more flow paths with flush water. In at least one embodiment, a method can include automatically flushing one or more acid control valves, one or more pumps or portions thereof, and/or related plumbing, such as with water from or under pressure via a water pump. In at least one embodiment, a method can include automatically flushing one or more acid control valves, one or more pumps or portions thereof, and/or related plumbing, when a predetermined quantity of acid/water mixture has been dispensed.

In at least one embodiment, a method according to the disclosure, such as a method of mixing acid with water or a method of making, producing, pumping or otherwise providing a mixture of acid and water, can include filling a tank at least partially with acid, taking into consideration one or more specifications for the acid, sampling acid in the tank, verifying a level or quantity of acid in the tank, inputting a specific gravity of the acid into a controller, inputting an acid concentration into the controller, inputting a mixture volume into the controller, inputting a flush volume into the controller, or any combination thereof. In at least one embodiment, a flush volume can be or include a system plumbing volume, such as a flow path volume of at least a portion of the system. In at least one embodiment, a method can include initiating, through or via one or more controllers, a mixing operation, such as to provide a mixture volume at an acid concentration.

In at least one embodiment, a method according to the disclosure, such as a method of mixing acid with water or a method of making, producing, pumping or otherwise providing a mixture of acid and water, can include inputting an acid specification into a controller, inputting an acid concentration into a controller, inputting a mixture volume into a controller, or any combination thereof. In at least one embodiment, a method can include initiating, through or using a controller, a mixing operation, such as for providing a mixture volume at an acid concentration. In at least one embodiment, a method can include filling a tank at least partially with acid, such as at a supplier location, reviewing one or more specifications, such as a specification provided at a supplier location, sampling acid in the tank, confirm acid in the tank meets one or more specifications, confirming a quantity of acid in the tank, or any combination thereof. In at least one embodiment, a method can include inputting a flush volume into a controller, such as a flush volume including a system plumbing volume.

Other and further embodiments utilizing one or more aspects of the disclosure can be devised without departing from the spirit of Applicants' disclosure. For example, the devices, systems and methods can be implemented for numerous different types and sizes in numerous different industries. Further, the various methods and embodiments of the devices, systems and methods can be included in combination with each other to produce variations of the disclosed methods and embodiments. Discussion of singular elements can include plural elements and vice versa. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the inventions has been described. Obvious modifications and alterations to the described embodiments are available to those of ordinary skill in the art having the benefits of the present disclosure. The disclosed and undisclosed embodiments are not intended to limit or restrict the scope or applicability of the inventions conceived of by the Applicants, but rather, in conformity with the patent laws, Applicants intend to fully protect all such modifications and improvements that come within the scope or range of equivalents of the following claims.

The invention claimed is:

1. A system for mixing acid and water, comprising:
   a tank for holding acid;
   an acid pump for pumping acid out of the tank;
   an acid flow meter downstream of the acid pump;
   an electronically controlled acid valve downstream of the acid pump;
   a water pump for pumping water;
   a water flow meter downstream of the water pump;
   an electronically controlled water valve downstream of the water pump;
   an electronically controlled flush valve configured to selectively permit water to flow from downstream of the water pump to upstream of the acid pump; and
   a controller configured to monitor the flow meters and control the pumps and the valves.

2. The system of claim 1, wherein the entire system is mounted on a skid and configured to deliver an acid/water mixture to at least one of a manifold, a frac pump or a combination thereof.

3. The system of claim 1, further comprising a vapor recovery unit fluidically coupled to the tank and configured to resist emission of acid vapors into the atmosphere.

4. The system of claim 1, further comprising a variable frequency drive (VFD) for each pump.

5. The system of claim 1, wherein the system is configured to output a predetermined acid/water mixture for pumping down a wellbore in connection with fracturing of a hydrocarbon formation.

6. A system for mixing acid from a tank with water, comprising:
   a skid;
   a water inlet line, wherein the water inlet line includes a first water inlet coupling configured to receive water from a first side of the skid and a second water inlet coupling configured to receive water from a second side of the skid, and wherein the first side is different from the second side;
   a water pump mounted to the skid for pumping water from the water inlet line;
   a water flow meter mounted to the skid downstream of the water pump;
   a water control valve mounted to the skid downstream of the water pump;
   an acid pump mounted to the skid for pumping acid out of the tank;
   an acid flow meter mounted to the skid downstream of the acid pump;
   an acid control valve mounted to the skid downstream of the acid pump;

an electronically controlled flush valve mounted to the skid and configured to selectively permit water to flow from downstream of the water pump to upstream of the acid pump; and a controller mounted to the skid and configured to monitor the flow meters and control the pumps and the valves.

7. The system of claim 6, wherein the tank and the skid are coupled to a trailer.

8. The system of claim 6, further including an acid inlet valve upstream of the acid pump, wherein the flush valve is configured to selectively permit water to flow from downstream of the water pump to between the acid pump and the acid inlet valve.

9. The system of claim 8, wherein the flush valve is further configured to open when the acid inlet valve closes.

10. The system of claim 8, wherein the controller is further configured to automatically open the flush valve when the controller closes the acid inlet valve.

11. The system of claim 8, wherein the controller is further configured to close the acid inlet valve and open the flush valve when a predetermined quantity of acid/water mixture has been dispensed.

12. The system of claim 8, wherein the controller is further configured to turn off the pumps once a predetermined quantity of water has been pumped through the acid control valve and the acid pump.

13. The system of claim 6, wherein the controller is further configured to control both pumps to maintain a target output pressure.

14. The system of claim 6, wherein the controller is further configured to control both pumps to maintain an output pressure of from 40 PSI to 65 PSI downstream of the pumps independently of flow through the pumps.

15. The system of claim 6, wherein the controller is further configured to control the water control valve and the acid control valve to maintain a predetermined acid/water mixture.

16. The system of claim 15, wherein the controller is further configured to compensate for a temperature of the acid by throttling the acid valve.

17. The system of claim 16, further including a temperature sensor that allows the controller to monitor a temperature of the acid.

18. The system of claim 6, wherein the skid is mounted to a trailer, and further including a generator coupled to the trailer for powering the pumps and the controller.

19. The system of claim 6, further including an acid inlet line having an acid inlet coupling configured to receive acid from a third side of the skid, wherein the third side is different than the first side and the second side.

20. A system for mixing acid from a tank with water, comprising:

a water pump control output configured to control a first speed of a water pump;

a water flow meter configured to monitor a water flow rate of the water through the water pump;

a water control valve configured to control the water flow rate;

an acid pump control output configured to control a second speed of an acid pump;

an acid flow meter configured to monitor an acid flow rate of the acid from the tank through the acid pump;

an acid control valve configured to control the acid flow rate;

an acid inlet valve configured to selectively permit acid to flow from the tank;

a temperature sensor configured to monitor a temperature of the acid;

a flush valve configured to selectively permit water to flow from downstream of the water pump to upstream of the acid pump;

an input device configured to receive an acid specific gravity, an acid concentration, a mixture volume, and a flush volume; and a controller configured to calculate an acid to water ratio to achieve the acid concentration using the acid specific gravity and the temperature of the acid;

control both pumps to maintain an output pressure;

control the water control valve and the acid control valve to maintain the acid concentration, until the mixture volume is reached, and control the acid inlet valve and the flush valve to automatically stop acid flow from the tank and flush the acid flow meter, the acid control valve, and the acid pump with water, after the mixture volume is reached.

* * * * *